US008520615B2

(12) United States Patent
Mehta et al.

(10) Patent No.: US 8,520,615 B2
(45) Date of Patent: Aug. 27, 2013

(54) BREAKOUT GATEWAY FOR MOBILE DATA TRAFFIC

(75) Inventors: Apurva Mehta, Cupertino, CA (US);
Kumar Mehta, Cupertino, CA (US);
Krishna Sankaran, Milpitas, CA (US);
Sanjiv Doshi, San Jose, CA (US);
Srinivasa Chaganti, San Ramon, CA (US); Bin Hong, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 431 days.

(21) Appl. No.: 12/853,707

(22) Filed: Aug. 10, 2010

(65) Prior Publication Data
US 2011/0235595 A1    Sep. 29, 2011

Related U.S. Application Data

(60) Provisional application No. 61/318,190, filed on Mar. 26, 2010.

(51) Int. Cl.
*H04Q 7/00*    (2006.01)
(52) U.S. Cl.
USPC .......................................................... 370/329
(58) Field of Classification Search
None
See application file for complete search history.

(56) References Cited

U.S. PATENT DOCUMENTS

| | | | | |
|---|---|---|---|---|
| 7,787,443 | B2 * | 8/2010 | Varney et al. .................. | 370/352 |
| 2004/0204095 | A1 * | 10/2004 | Cyr et al. ....................... | 455/560 |
| 2005/0170816 | A1 * | 8/2005 | Pelaez et al. ............... | 455/412.2 |
| 2007/0232301 | A1 * | 10/2007 | Kueh ............................. | 455/433 |
| 2008/0137541 | A1 * | 6/2008 | Agarwal et al. ............... | 370/241 |
| 2009/0005008 | A1 * | 1/2009 | Son et al. .................... | 455/412.1 |
| 2009/0041223 | A1 * | 2/2009 | Agarwal et al. .......... | 379/211.02 |
| 2009/0131017 | A1 * | 5/2009 | Osborn ......................... | 455/411 |
| 2009/0232019 | A1 * | 9/2009 | Gupta et al. .................. | 370/252 |
| 2010/0077102 | A1 * | 3/2010 | Lim et al. ...................... | 709/240 |
| 2010/0144363 | A1 * | 6/2010 | De Rosa et al. ............ | 455/452.1 |
| 2010/0195621 | A1 * | 8/2010 | Kekki et al. ................... | 370/332 |
| 2010/0222071 | A1 * | 9/2010 | Tafreshi et al. ............... | 455/453 |
| 2011/0013566 | A1 * | 1/2011 | Aso et al. ...................... | 370/328 |
| 2011/0075633 | A1 * | 3/2011 | Johansson et al. ............ | 370/331 |

(Continued)

OTHER PUBLICATIONS

Office Action from U.S. Appl. No. 12/748,245, dated Aug. 13, 2012, 17 pp.

(Continued)

*Primary Examiner* — Hassan Phillips
*Assistant Examiner* — Prenell Jones
(74) *Attorney, Agent, or Firm* — Shumaker & Sieffert, P.A.

(57) ABSTRACT

In general, the invention is directed to techniques for breaking out mobile data traffic from a mobile service provider network to a packet data network. For example, as described herein, a breakout gateway device (BGW) receives a first service request and data traffic for a data session associated with the requested service from a mobile device in a radio access network, wherein the first service request is addressed to a serving node of a mobile core network of the mobile service provider network, and wherein the data traffic is destined for the PDN. A control packet analysis module forwards the first service request from the breakout gateway device to the serving node. A breakout module of the BGW bypasses the serving node by sending the data traffic from the breakout gateway device to the PDN on a data path from the radio access network to the PDN.

34 Claims, 17 Drawing Sheets

(56) References Cited

U.S. PATENT DOCUMENTS

| | | | |
|---|---|---|---|
| 2011/0075659 A1* | 3/2011 | Kant et al. | 370/356 |
| 2011/0075675 A1* | 3/2011 | Koodli et al. | 370/401 |
| 2011/0110378 A1* | 5/2011 | Savolainen et al. | 370/400 |
| 2011/0176531 A1* | 7/2011 | Rune et al. | 370/338 |
| 2011/0295996 A1* | 12/2011 | Qiu et al. | 709/224 |
| 2012/0177193 A1* | 7/2012 | Keller et al. | 379/211.01 |
| 2012/0224536 A1* | 9/2012 | Hahn et al. | 370/328 |

OTHER PUBLICATIONS

Response to Office Action dated Aug. 13, 2012, from U.S. Appl. No. 12/748,245, filed Nov. 13, 2012, 20 pp.

3GPP TS 23.060, V9.3.0, "General Packet Radio Service (GPRS); Service description," Stage 2, Release 9, Dec. 2009, 295 pp.

3GPP TS 25.413, V8.3.0, "UTRAN Iu interface, Radio Access Network Application Part (RANAP) signalling," Release 8, Jun. 2009, 398 pp.

* cited by examiner

BREAKOUT GATEWAY FOR MOBILE DATA TRAFFIC

This application claims the benefit of U.S. Provisional Application No. 61/318,190, filed Mar. 26, 2010, the entire content of which is incorporated by reference herein.

TECHNICAL FIELD

The invention relates to cellular networks and, more particularly, to offloading mobile traffic in a mobile service provider network.

BACKGROUND

A cellular radio access network is a collection of cells that each includes at least one base station capable of transmitting and relaying signals to subscribers' mobile devices. A "cell" generally denotes a distinct area of a cellular network that utilizes a particular frequency or range of frequencies for transmission of data. A typical base station is a tower to which are affixed a number of antennas that transmit and receive the data over the particular frequency. Mobile devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Cellular service providers convert cellular signals, e.g., Time Division Multiple Access (TDMA) signals, Orthogonal Frequency-Division Multiplexing (OFDM) signals or Code Division Multiple Access (CDMA) signals, received at a base station from mobile devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, mobile IP standardized by the Internet Engineering Task Force (IETF), as well as, other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile network includes GPRS core circuit-switched and packet-switched networks, a backhaul network, and a number of radio access networks. A backhaul network for the mobile network includes land-based transmission lines, frequently leased by the service provider, to transport mobile data and control traffic between radio access network base stations and the core networks. The backhaul network also includes network devices, such as the radio network controllers (RNCs) of the radio access networks, aggregation devices, and routers.

The core packet-switched network for the mobile network provides access to one or more packet data networks (PDNs), which may include, for example, the Internet, an enterprise intranet, a layer 3 VPN, and a service provider's private network. Various PDNs provide a variety of packet-based data services to mobile devices, such as bulk data delivery, voice over Internet protocol (VoIP), Internet protocol television (IPTV), and the Short Messaging Service (SMS). Service providers are seeing rapid growth in demand for data services, and this trend will continue to accelerate.

In addition to providing access to PDNs, the core packet-switched network for a service provider's mobile network also provides core support services for the packet-based services of the PDNs. Core support services enable and promote efficiency, security, mobility, and accounting for the packet-based services. GPRS support nodes (GSNs) within the core packet-switched network of the mobile network provider distribute the functionality of the core support services among Serving GSNs (SGSNs), which each serve groups of radio access networks that provide the front-end interface to the mobile devices, and Gateway GSNs (GGSNs), which are edge nodes logically located between the core packet-switched network and the PDNs. The SGSNs and GGSNs may perform, for example, authentication, session management, mobility management, compression, encryption, billing, and filtering for a service provider's GPRS core network.

SUMMARY

In general, techniques are described for breaking out mobile data traffic in a mobile service provider network. For example, for a mobile service provider network that includes a mobile core network, a backhaul network, and one or more radio access networks (RANs), the techniques may be applied to bypass both the mobile core network and portions of the backhaul network by "breaking out" mobile data traffic from the backhaul network.

A breakout gateway device (BGW), as described herein, is positioned within the mobile backhaul network to aggregate and serve a set of one or more RNCs. An administrator provisions the BGW with a list of identifiers that specify for the BGW the mobile sessions for which associated data traffic is to bypass the mobile core network. As part of a mobile session setup for a mobile device, a GGSN assigns the mobile device a packet data protocol (PDP) address for use by the mobile device as a source PDP address. The BGW analyzes control traffic traversing the backhaul network between the RANs and the mobile core network. If control traffic comprises a PDP address assignment and includes an identifier specified in the provisioned list of identifiers, the BGW replaces the PDP address assigned by a GGSN with a PDP address served by the BGW and advertised by the BGW to upstream networks.

Thereafter, the BGW redirects mobile data traffic sourced by BGW-assigned PDP addresses to upstream networks to bypass the remainder of the backhaul network and the mobile core network. In addition, upstream networks route downstream traffic addressed to a BGW-assigned PDP address to the BGW, bypassing portions of the backhaul network and the mobile core network.

In one embodiment, the invention is directed to a method comprising the step of receiving, with a breakout gateway device positioned within a mobile service provider network, a first service request from a radio access network, wherein the first service request specifies a requested service supported by a packet data network (PDN). The method further comprises the step of forwarding the first service request from the breakout gateway device to a serving node of a mobile core network of the mobile service provider network, wherein the serving node couples the mobile core network to the radio access network to provide a first data path for the radio access network to the PDN. The method additionally comprises the step of receiving, with the breakout gateway device, data traffic for a data session associated with the requested service from a mobile device in the radio access network, wherein the data traffic is destined for the PDN. The method further comprises the step of bypassing the serving node by sending the data traffic from the breakout gateway device to the PDN on a second data path from the radio access network to the PDN.

In another embodiment, the invention is directed to a breakout gateway device positioned within a mobile service provider network, comprising a network interface to receive a first service request and data traffic for a data session associated with the requested service from a mobile device in a radio access network, wherein the first service request is addressed to a serving node of a mobile core network of the mobile service provider network and specifies a requested service supported by a packet data network (PDN), and wherein the data traffic is destined for the PDN. The breakout gateway device additionally comprises a control packet analysis module to forward the first service request from the breakout gateway device to the serving node, wherein the serving node couples the mobile core network to the radio access network to provide a first data path for the radio access network to the PDN. The breakout gateway device further comprises a breakout module to bypass the serving node by sending the data traffic from the breakout gateway device to the PDN on a second data path from the radio access network to the PDN.

In another embodiment, the invention is directed to a computer-readable medium containing instructions. The instructions cause a programmable processor to receive, with a breakout gateway device positioned within a mobile service provider network, a first service request from a radio access network, wherein the first service request specifies a requested service supported by a packet data network (PDN). The instructions additionally cause the programmable processor to forward the first service request from the breakout gateway device to a serving node of a mobile core network of the mobile service provider network, wherein the serving node couples the mobile core network to the radio access network to provide a first data path for the radio access network to the PDN. The instructions further cause the programmable processor to receive, with the breakout gateway device, data traffic for a data session associated with the requested service from a mobile device in the radio access network, wherein the data traffic is destined for the PDN. The instructions additionally cause the programmable processor to bypass the serving node by sending the data traffic from the breakout gateway device to the PDN on a second data path from the radio access network to the PDN.

The techniques herein described may present one or more advantages. For instance, in some environments a significant portion of mobile traffic (e.g., flat-rate and capped flat-rate data traffic) may not require the extensive services provided by a mobile core network of a mobile service provider. Selectively offloading mobile data traffic from the backhaul network may allow the mobile service provider to avoid outlaying the resources, such as additional support nodes, processing power, and bandwidth, that would otherwise be needed to apply core support services to the offloaded mobile traffic. In addition, selectively offloading mobile data traffic may enable the mobile service provider to reduce its utilization of the backhaul network. Because a backhaul network often includes leased land-based transmission lines, the service provider may, in some instances, reduce backhaul-related leasing costs.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
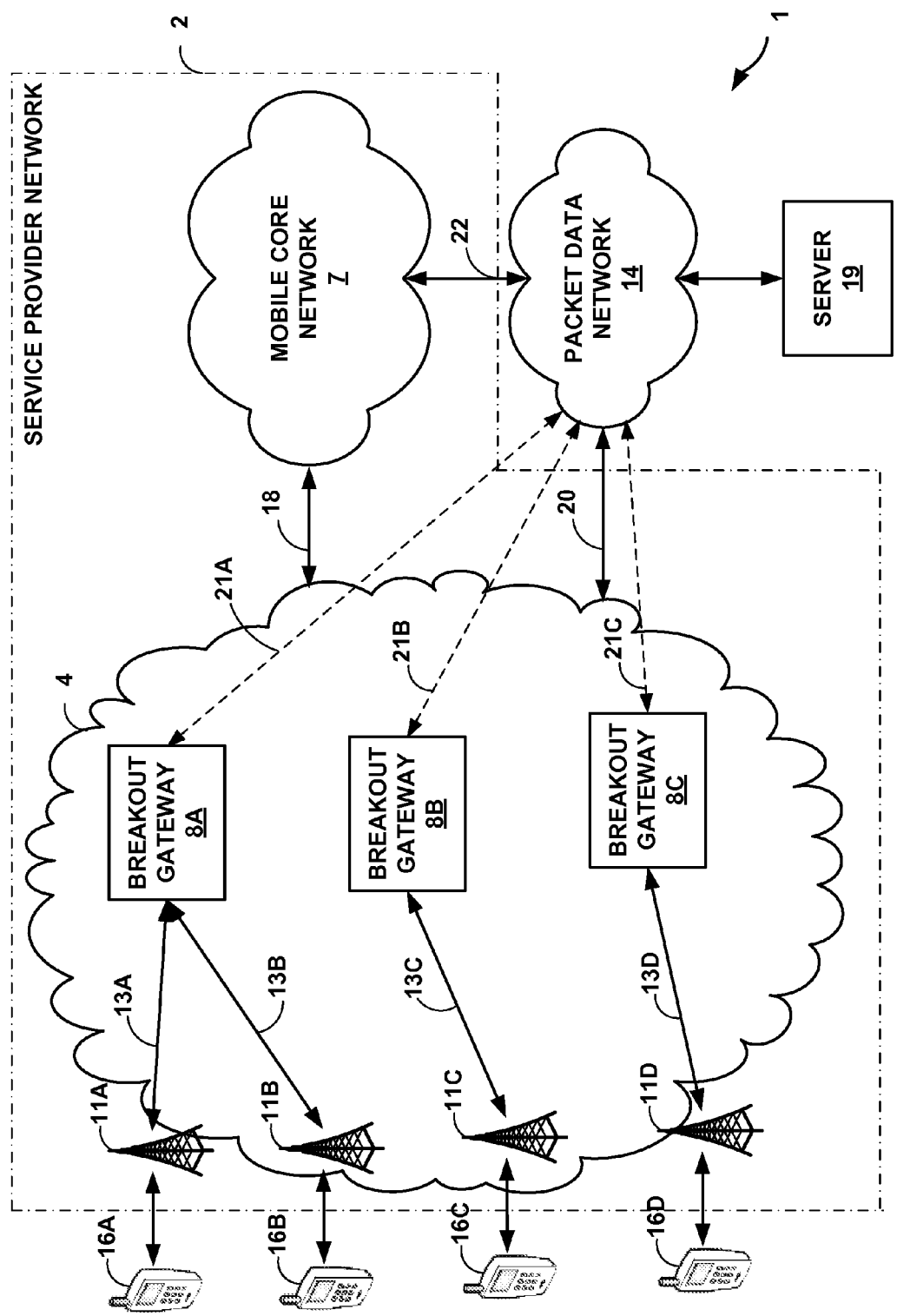
FIG. 1 is a block diagram illustrating an exemplary network system that includes a number of breakout gateways that offload mobile data traffic from a mobile service provider network according to the techniques of this disclosure.

FIG. 1 is a block diagram illustrating an exemplary network system 1 operating according to the described techniques. In this example, network system 1 comprises packet data network (PDN) 14 coupled to server 19 and to mobile service provider network 2. Packet data network 14 supports one or more packet-based services provided by server 19 that are available for request and use by any of mobile devices 16A-16D ("mobile devices 16"). As examples, PDN 14 in conjunction with server 19 may provide bulk data delivery, voice over Internet protocol (VoIP), Internet protocol television (IPTV), Short Messaging Service (SMS), and Wireless Application Protocol (WAP) service. Packet data network 14 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates mobile service provider network 2, an enterprise IP network, or some combination thereof. In various embodiments, PDN 14 is connected to a public WAN, the Internet, or to other networks. Packet data network 14 executes one or more packet data protocols (PDPs), such as IP (IPv4 and/or IPv6), X.25 or Point-to-Point Protocol (PPP), to enable packet transport for server 19 services.

Each of mobile devices 16 is a wireless communication device that may comprise, for example, a mobile telephone, a laptop or desktop computer having, e.g., a 3G wireless card, a wireless-capable netbook, a video game device, a pager, a smart phone, or a personal data assistant (PDA). Each of mobile devices 16 may run one or more applications, such as mobile calls, video games, videoconferencing, and email, among others. Certain applications running on mobile devices 16 may require access to services offered by server 19 via PDN 14.

A service provider operates mobile service provider network 2 to provide network access, data transport and other services to mobile devices 16. Mobile service provider network 2 comprises mobile core network 7, base stations 11A-11D, and backhaul network 4. Mobile devices 16 communicate with base stations 11A-11D ("base stations 11") over wireless links to access mobile service provider network 2.

Backhaul network 4 is a transport network that enables base stations 11 to exchange packetized data with mobile core network 7 and PDN 14. Backhaul network 4 comprises communication nodes interconnected by communication links, such as leased land-lines or point-to-point microwave connection. The communication nodes comprise network, aggregation, and switching elements that execute one or more protocols to route packets between base stations 11 and a respective gateway device for either mobile core network 7 or PDN 14. In various aspects, backhaul network 4 may comprise a GSM radio access network (GRAN) or a Universal Mobile Telephony Service (UMTS) terrestrial radio access network (UTRAN) operating according to respective radio access network standards set forth by the relevant standards-setting body (e.g., 3GPP). Backhaul network 4 is coupled to mobile core network 7 via communication link 18 and to PDN 14 via communication link 20. The term "communication link," as used herein, comprises any form of transport medium, wired or wireless, and can include intermediate nodes such as network devices. Communication links 18 and 20 may, for instance, each comprise an asymmetric digital subscriber line (DSL) network, WiMAX, a T-1 line, an Integrated Service Digital Network (ISDN), wired Ethernet, or other type of network. Elements of backhaul network 4 may communicate using Asynchronous Transfer Mode (ATM).

Mobile core network 7 provides session management, mobility management, and transport services between backhaul network 4 and PDN 14 to support access, by mobile devices 16, to PDN 14 and services of server 19. Mobile core network 7 is coupled to PDN 14 via communication link 22. Mobile core network 7 may comprise, for instance, a general packet radio service (GPRS) core packed-switched network, a GPRS core circuit-switched network, an IP-based mobile multimedia core network, or another type of transport network. Mobile core network 7 comprises one or more packet processing nodes to support firewall, load balancing, billing, deep-packet inspection (DPI), and other services for mobile traffic traversing the mobile core network.

Elements of backhaul network 4 and mobile core network 7 cooperate to establish and operate traffic bearers to transport mobile traffic, in the form of PDP packet data units (PDUs), between mobile devices 16 and a gateway node (not shown in FIG. 1) of mobile core network 7 (i.e., a communication node that couples mobile core network 7 to PDN 14 via communication link 22). For example, a particular traffic bearer between mobile device 16A and a gateway node of mobile core network 7 may be operated according to session data and various protocols executing on mobile device 16A, base station 11A, breakout gateway 8A and other elements of backhaul network 4, and elements of mobile core network 7. A traffic bearer may be composed of multiple sub-bearers connecting individual elements that operate the traffic bearer.

Packets traversing mobile service provider network 2 between one of mobile devices 16 and PDN 14 may thus comprise an inner routing header that includes a source PDP address and a destination PDP address, as well as an outer routing header that includes a source IP address and a destination IP address. Elements of mobile service provider network 2 use the outer routing header of a packet to route a packet to the appropriate gateway (i.e., one of BGWs 8 or a gateway of mobile core network 7), or to the appropriate one of mobile devices 16. In some instances, the source PDP address and destination PDP address of an inner header are IP addresses.

According to the techniques described, backhaul network 4 further comprises breakout gateways 8A-8C ("BGWs 8") to divert mobile data traffic issuing from mobile devices 16 to PDN 14 via respective breakout links 21A-21C ("breakout links 21"), thereby bypassing both mobile core network 7 and, in some instances, elements of backhaul network 4 that lie on a forwarding path from BGWs 8 to mobile core network 7. Each of breakout links 21 comprises communication link 20. Each of BGWs 8 may be an independent communication node operating within or at the edge of backhaul network 4. In some embodiments, any of BGWs 8 may be a component or module of another communication element, such as a router, within backhaul network 4.

BGWs 8 are each communicatively coupled to one or more base stations 11 via communication links 13A-13D. Mobile traffic traversing backhaul network 4 between base stations 11 and mobile core network 7 traverses at least one of BGWs 8, which permits the BGWs to monitor properties of the mobile control traffic. Mobile control traffic includes signaling messages for establishing and tearing down traffic bearers, migrating session data among elements of backhaul network 4 and mobile core network 7 for mobility, and other functions. Mobile control traffic may include fields that identify services, subscribers, and mobile devices.

Each of BGWs 8 includes configuration data that designates selected mobile data traffic for breakout based on properties of the corresponding mobile control traffic. Accordingly, BGWs 8 breakout selected mobile data traffic from backhaul network 4 when corresponding mobile control traffic exhibits one or more properties that indicate, in the configuration data, that such the mobile data traffic is designated for breakout. Mobile data traffic corresponds to mobile control traffic when the data traffic is carried by traffic bearers established by elements of network system 1 in accordance with the mobile control traffic.

In one example, BGW 8A receives a mobile control traffic from base station 11A and determines a subscriber identifier specified by the control traffic. BGW 8A then queries the configuration data to determine, based on the subscriber identifier, whether mobile data traffic corresponding to the mobile control traffic is designated for breakout. If the mobile data traffic is not designated for breakout, BGW 8A forwards the mobile data traffic on a forwarding path that traverses mobile core network 7. If, however, the mobile data traffic is designated for offload, BGW 8A establishes a breakout data path to PDN 14 for the data traffic. The breakout data path bypasses mobile core network 7 and, in some instances, elements of backhaul network 4. In this example, the breakout data path for the mobile data traffic includes breakout link 21A to PDN 14. In addition, BGW 8A advertises a routing identifier (e.g., an IP address) to enable PDN 14 to route downstream designated mobile data traffic to BGW 8A via communication link 20 rather than to mobile core network 7 via communication link 22. In this example, the downstream forwarding path for the designated mobile data traffic includes breakout link 21A.

Having established a breakout data path for the designated mobile data traffic, BGW 8A thereafter directs the designated mobile data traffic, received from mobile device 16A via base station 11A, onto the breakout data path for forwarding to PDN 14. BGW 8A also receives downstream designated mobile data traffic from PDN 14 via breakout link 21A. BGW 8A thus terminates a breakout traffic bearer that carries designated mobile data traffic between mobile device 16A and PDN 14 while bypassing mobile core network 7. As a result, BGW 8A, although not an element of mobile core network 7, is a gateway device that enables PDN 14 to access mobile service provider network 2 and vice-versa. BGW 8A continues to forward non-designated mobile data traffic over a standard traffic bearer that includes mobile core network 7.

The techniques of this disclosure may provide certain advantages. For instance, in the absence of the techniques described herein, mobile core network 7 may apply services (e.g., load balancing and walled-garden services such as deep packet inspection) to mobile data traffic that does not require such services. In such instances, mobile core network 7 must scale correlative to increasing mobile traffic, requiring capital expenditures for additional service providing nodes to meet increasing demand. The techniques described may allow diversion of designated mobile data traffic to communication link 20, which may comprise a low-cost, high-volume network (e.g., a broadband network), thereby bypassing mobile core network 7 and with it, the relatively high costs of applying unnecessary services to the mobile traffic. In addition, the techniques may enable designated mobile data traffic to bypass one or more elements of backhaul network 4, which may include leased transmission media and/or legacy elements having low bandwidth capacity. As a result, the techniques may reduce service provider leasing costs and/or capital expenditures that would otherwise be required to upgrade backhaul network 4 to carry the increasing demands of mobile data traffic.

Figure 2:
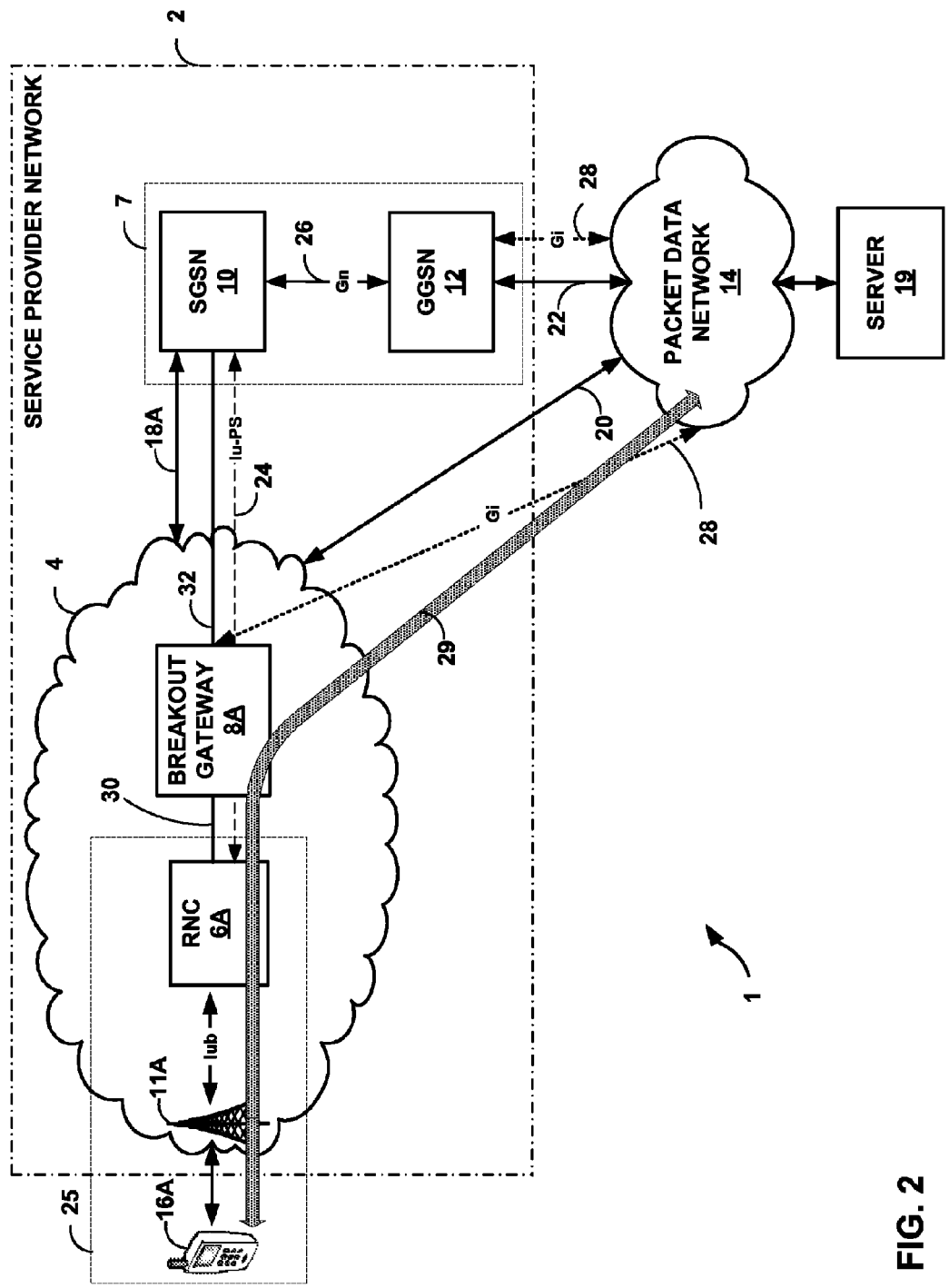
FIG. 2 is a block diagram illustrating a Universal Mobile Telephony Service (UMTS) network having a topology-dependent breakout gateway that offloads mobile data traffic from the network according to the techniques of this disclosure.

FIG. 2 is a block diagram illustrating an exemplary embodiment of network system 1 in further detail. In this example, mobile service provider network 2 comprises a Universal Mobile Telephony Service (UMTS) network that operates in accordance with the 3rd Generation Partnership Project (3GPP) standards and with the techniques described herein. For purposes of illustration, the techniques herein will be described with respect to a UMTS network. However, the techniques are applicable to other communication network types in other examples. For instance, the techniques are similarly applicable to network architectures and nodes deploying 3GPP/2, WiMAX, and Mobile IP based technologies and standards.

Mobile service provider network 2 includes a general packet radio service (GPRS) core packed-switched network 7 (hereinafter, "GPRS core network 7"), which illustrates an embodiment of mobile core network 7 of FIG. 1 in further detail. In this embodiment, backhaul network 4 comprises radio network controller 6A ("RNC 6A") coupled to base station 11A via an Iub interface. RNC 6A and base station 11A form a UMTS Terrestrial Radio Access Network (UTRAN) 25 communicatively coupled to GPRS core network 7 via Iu-PS interface 24 operating over backhaul network 4. UTRAN 25 thus provides wireless access by mobile device 16A to GPRS core network 7.

GPRS core network 7 provides packet-switched (PS) services to UTRAN 25. For example, GPRS core network 7 provides packet routing and switching, as well as mobility management, authentication, and session management for mobile devices 16 served by UTRAN 25. In some examples, mobile service provider network 2 may include additional nodes to further provide circuit-switched (CS) services. In such examples, mobile service provider network 2 further includes an Iu-CS interface (not shown) to communicatively couple the additional nodes to UTRAN 25 to enable real-time, circuit-switched communication.

The packet-switched services provided by GPRS core network 7 may include mobility services, such as authentication and roaming services, as well as call handling services, signaling, billing, and internetworking between GPRS core network 7 and external networks, such as PDN 14. In some examples, GPRS core network 7 is connected to one or more other carrier networks, such as the Internet and the Integrated Services Digital Network (ISDN).

Iu-PS interface 24 operates over backhaul network 4 and provides UTRAN 25 with access to core support services provided by GPRS core network 7. In general, Iu-PS interface 24 supports protocols that enable communication between UTRAN 25 and GPRS core network 7. In the example of mobile service provider network 2, Iu-PS interface 24 supports Signaling ATM Adaptation Layer (SAAL) and ATM Adaptation Layer 5 (AAL5) running over Asynchronous Transfer Mode (ATM). Iu-PS interface 24 further supports Radio Access Network Application Part (RANAP) running over Signaling Connection Control Part (SCCP) protocol for handling signaling/control between UTRAN 25 and GPRS core network 7, as well as the GPRS Tunneling Protocol (GTP) running over User Datagram Protocol (UDP) for transferring data. Iu-PS interface 24 supporting RANAP may carry GPRS-specific applications, including GPRS Mobility Management (GMM), Session Management (SM), and Short Message Service (SMS). In this example, backhaul network 4 is an IP network.

Base station 11A is connected to RNC 6A via Iub interface 22 operating over a communication link. Base station 11A, in this embodiment, comprises a Node B base transceiver station that uses an air interface to communicate with user equipment in the geographic region (or "cell") that base station 11A serves. In some embodiments, base station 11A comprises a femtocell. Mobile device 16A is located within the cell served by base station 11A. UTRAN 25 may, in some instances, comprise additional base stations, each of which may serve one of several cells. In some examples, base station 11A may be another type of wireless transceiver station, such as a site controller or a WiMAX access point. User equipment, such as mobile device 16A, may be referred to in alternative architectures as a mobile station (MS).

Mobile device 16A has associated identifying information that may include, for example, a Mobile Subscriber ISDN Number (MSISDN), an International Mobile Subscriber Identity (IMSI), or an International Mobile Equipment Identity (IMEI) stored, for instance, in a subscriber identity module (SIM) or in mobile device 16A memory.

RNC 6A manages and routes data to/from base station 11A and interfaces UTRAN 25 to GPRS core network 7 via Iu-PS interface 24. As such, RNC 6A executes protocols supported by Iu-PS interface 24 (e.g., GTP) and may therefore, for instance, establish and support GTP tunnels to nodes in GPRS core network 7. In some instances, RNC 6A comprises an IP router. In some embodiments, UTRAN 25 may comprise additional RNCs and associated base stations variously arranged.

In the illustrated embodiment, GPRS core network 7 comprises serving GPRS support node 10 ("SGSN 10"), and gateway GPRS support node 12 ("GGSN 12"). SGSN 10 uses Access Point Names (APNs) to switch mobile traffic for UTRAN 25 to available GGSNs, such as GGSN 12. GPRS support nodes (GSNs) of GPRS core network 7 communicate using Gn interface 26 operating over a communication link, which may comprise an IP network. In some embodiment, Gn interface 26 thus uses an Internet Protocol, such as IPv4 and/or IPv6, at the network layer of the Gn interface 26 protocol stack.

In addition, SGSN 10 serves RNC 6A, to which it is communicatively coupled via Iu-PS interface 24 operating over a communication link, and thus executes downstream protocols supported by Iu-PS interface 24 (e.g., GTP). Mobile device 16A connects to SGSN 10 during a GPRS Attach procedure. As an aspect of this procedure, mobile device 16A sends identifying information (e.g., an IMSI) to SGSN 10 via RNC 6A, which SGSN 10 uses to authenticate the mobile device in cooperation with other GPRS core network 7 elements, such as a Home Location Register (HLR) (not shown). Upon completion of the GPRS Attach, SGSN 10 begins tracking the mobile device 16A location as it moves among cells of UTRAN 25.

GGSN 12 is a gateway node that connects GPRS core network 7 (and hence service provider network 2) to PDN 14 via Gi interface 28 operating over communication link 22. GGSN 12 enables access to one or more services provided by server 19 via PDN 14, and GGSN 12 maps accessible services to APNs. For example, GGSN 12 may comprise a data structure that maps APNs to the packet data protocol (PDP) address of the appropriate service node (e.g., server 19). In other examples, GGSN 12 queries, using a received APN, a server for a PDP address of the appropriate service node for the APN.

In accordance with the described techniques, backhaul network 4 further comprises breakout gateway 8A logically situated on Iu-PS interface 24. BGW 8A executes Iu-PS protocols, including RANAP and GTP for signaling and data transport, respectively.

In the example embodiment, BGW 8A lies on the forwarding paths between RNC 6A and SGSN 10. That is, BGW 8A is a next hop on a forwarding path from RNC 6A to SGSN 10 and also a next hop on a forwarding path from SGSN 10 to RNC 6A. BGW 8A is coupled to RNC 6A and SGSN 10 via respective communication links 30 and 32.

BGW 8A does not include any proxy functionality and is therefore topology-dependent. That is, the BGW 8A of FIG. 3 must lie on the forwarding paths between RNC 6A and SGSN 10. However, BGW 8A is logically located on Iu-PS interface 24. BGW 8A, although not functioning as a proxy and therefore not addressed as a destination device for mobile control and data traffic, snoops mobile control traffic that traverses the forwarding paths between RNC 6A and SGSN 10 and modifies the control traffic, as described in detail below, in accordance with the described techniques.

BGW 8A is additionally logically situated on Gi interface 28 executing over elements of backhaul network 4 and communication link 20 to PDN 14. BGW 8A advertises a routable PDP address to PDN 14, making BGW 8A accessible via a forwarding path that includes communication link 20. Consequently, BGW 8A is a gateway node for service provider network 2 that enables access by mobile device 16A to one or more services provided by server 19 via PDN 14.

As elements of enabling access to PDN 14, Gi interface 28 may provide one or more of authentication, accounting/billing, and authorization for mobile device 16A and users thereof. For example, each of GGSN 12 and BGW 8A may comprise a Remote Authentication Dial-In User Service (RADIUS) client that connects to a RADIUS server (not shown) operating on Gi interface 28 and containing a database of user access credentials, such as username/password combinations, mobile device records, and identifying information. In one example, the RADIUS client may, using an IMSI, authenticate the user of mobile device 16A that is requesting a service from PDN 14.

BGW 8A monitors signaling traffic traversing BGW 8A on Iu-PS interface 24 to identify data traffic that BGW 8A is to breakout on Gi interface 28 to PDN 14 via communication link 20. In one example, BGW 8A stores breakout indicators that map to properties of signaling traffic. Breakout indicators may include, for instance, APNs, IMSI or IMEI values, a quality of service (QoS) profile, a static or semi-static PDP address of mobile device 16A, a PDP address assigned by GGSN 12 to mobile device 16A, or another property. When a value of a breakout indicator stored by BGW 8A matches a value of a property of the signaling traffic, BGW 8A takes steps to breakout the corresponding mobile data traffic. In another example, BGW 8A queries, using properties of the signaling traffic, an Authentication, Authorization, and Accounting (AAA) server (e.g., a RADIUS server). The AAA server responds to a BGW 8A query with an indication of whether BGW 8A should breakout corresponding mobile data traffic for the signaling traffic.

For example, mobile device 16A activates access to GPRS core network 7 by initiating a GPRS Attach procedure with an Attach Request message to SGSN 10. BGW 8A intercepts the Attach Request message as it traverses backhaul network 4 from RNC 6A to SGSN 10. BGW 8A then extracts, from the message, one or more identifiers for mobile device 16A, such as an IMSI, a packet-temporary mobile subscriber identity (P-TMSI), or an SCCP connection identifier. BGW 8A also extracts the IP addresses of RNC 6A and SGSN 10, creates a record for mobile device 16A, and stores the extracted data in the record. BGW 8A then forwards the Attach Request message to SGSN 10, which may authenticate and authorize mobile device 16A and then reply to mobile device 16A with an Attach Accept message.

To establish a traffic bearer that enables data traffic exchange between mobile device 16A and GGSN 12, mobile device 16A sends SGSN 10 an Activate PDP Context Request message that comprises an APN requested. In general, an APN comprises a mandatory network identifier that specifies either an external packet data network (e.g., PDN 14) or a service (e.g., Internet).

SGSN 10 uses the APN received in the Activate PDP Context Request message to determine the appropriate GGSN linked to the PDN or service specified by the APN. In the illustrated embodiment, SGSN 10 sends GGSN 12 a Create PDP Context Request message that requests GGSN 12 to establish a PDP context for mobile device 16A as well as a GTP tunnel with which to transport mobile data traffic between SGSN 10 and GGSN 12. In general, a PDP context is a data structure stored on each of mobile device 16A, SGSN 10, and GGSN 12 that the devices use to forward mobile data traffic identified by the PDP context. In the illustrated embodiment, the PDP contexts on each of mobile device 16A, SGSN 10, and GGSN 12 link two GTP tunnels that intersect at SGSN 10 to form a traffic bearer (i.e., a 3GPP bearer) between mobile device 16A and GGSN 12.

The Create PDP Context Request message comprises the APN network identifier received by SGSN 10, as well as a Tunnel Endpoint Identifier (TEID) created by SGSN 10 that identifies the SGSN 10 side of a GTP tunnel to be established between SGSN 10 and GGSN 12 for a new PDP context. GGSN 12 creates a new PDP context responsive to the message received from SGSN 10 and installs the new PDP context into the GGSN 12 PDP context table. GGSN 12 also establishes a GTP tunnel to SGSN 10 for the new PDP context and sends SGSN 10 a Create PDP Context Response message that includes a TEID for the GGSN 12 side of the tunnel. To send SGSN 10 mobile data packets using this GTP tunnel, GGSN 12 uses the TEID it received from SGSN 10 in the Create PDP Context Request message. To send GGSN 12 packets using this GTP tunnel, SGSN 10 uses the TEID it received from GGSN 12 in the Create PDP Context Response message.

The Create PDP Context Response message from GGSN 12 to SGSN 10 may also include a PDP address assigned to mobile device 16A. The PDP address is routable by PDN 14 and provides a destination address for mobile device 16A that enables mobile device 16A to exchange packets with PDN 14 to access services provided by server 19. GGSN 12 may comprise an available pool of public or private PDP addresses for assignment to requesting mobile devices. In some embodiments, GGSN 12 connects to a Dynamic Host Configuration Protocol (DHCP) server (not shown) operating on Gi interface 28 to obtain a dynamically allocated PDP address for mobile device 16A during a PDP context activation. Using a DHCP server may have an advantage of centralized administration of the available address pool.

Upon receiving the Create PDP Context Response message from GGSN 12, SGSN 10 installs a PDP context for mobile device 16A and attempts to establish a radio access bearer (RAB) with RNC 6A by sending RNC 6A a RAB Assignment Request message. The RAB Assignment Request message is a request by SGSN 10 to establish, modify, or release a RAB comprising both a radio bearer to exchange data between mobile device 16A and RNC 6A as well as a GTP tunnel between RNC 6A and SGSN 10. The RAB Assignment Request message may include a Tunnel Endpoint Identifier (TEID) created by SGSN 10 that identifies the SGSN 10 side of a GTP tunnel to be established between RNC 6 and SGSN 10 for the PDP context. BGW 8A forwards the RAB Assignment Request message to RNC 6A, which sends a responsive RAB Assignment Response to SGSN 10 to inform the SGSN of the result of the RAB Assignment Request.

BGW 8A establishes a GTP-U tunnel with RNC 6A for breakout mobile data traffic. In such instances, BGW 8A intercepts the RAB Assignment Request message from SGSN 10 to RNC 6A and inspects the message properties to determine whether one or more of the property values match a breakout indicator value stored by BGW 8A. For example, the RAB Assignment Request message may include an IMSI value that BGW 8A matches to a breakout indicator value. If a message property value matches a breakout indicator value, BGW 8A extracts the embedded TEID for the SGSN 10 side of the GTP tunnel, or "upstream TEID," and stores the upstream TEID in a record for mobile device 16A. In addition, BGW 8A extracts the source (i.e., SGSN 10) and destination (i.e., RNC 6A) addresses for the RAB Assignment Request message and stores these in the record. BGW 8A then spoofs the identity of SGSN 10 in the message by replacing the source address with an IP address of BGW 8A. As a result, BGW 8A will receive the responsive RAB Assignment Response message from RNC 6A that, in general, RNCs use to inform an SGSN of the result of a RAB Assignment Request. BGW 8A replaces the upstream TEID with a new TEID, allocated by and specific to BGW 8A.

If RNC 6A successfully establishes a RAB for the breakout mobile data traffic, the RAB Assignment Response message includes a TEID for the RNC 6A side of the GTP tunnel, or "downstream TEID," that RNC 6A and BGW 8A now terminate. BGW 8A stores the downstream TEID in the record for mobile device 16A and uses the downstream TEID and the IP address of RNC 6A to send breakout mobile data traffic (i.e., GTP-U traffic) to RNC 6A via the associated GTP tunnel. RNC 6A uses the IP address for BGW 8A and the TEID that RNC 6A received in the RAB Assignment Request message to send breakout mobile data traffic to BGW 8A through the GTP tunnel. The TEID that RNC 6A received in the RAB Assignment Request message now identifies the BGW 8A side of a GTP tunnel terminated by both BGW 8A and RNC 6A. BGW 8A forwards RAB Assignment Response messages from RNC 6A to SGSN 10 using the extracted upstream TEID to continue the PDP activation requested by mobile device 16A.

SGSN 10 completes the PDP context activation requested by mobile device 16A by sending an Activate PDP Context Accept message to RNC 6A. The message may include a PDP address assigned by GGSN 12 to mobile device 16A.

In one aspect of the techniques, BGW 8A intercepts the Activate PDP Context Accept message and inspects the message properties to determine whether one or more of the property values match a breakout indicator value stored by BGW 8A. For example, the Activate PDP Context Accept message may include an APN value that BGW 8A matches to a breakout indicator value. If one of the property values of the message matches a breakout indicator value, BGW 8A establishes breakout data path 29 for mobile data traffic associated with the new PDP context. Breakout data path 29 is an access path for mobile service provider network 2 to PDN 14.

In one example for establishing a breakout data path 29, when the Activate PDP Context Accept message includes a PDP address assignment for mobile device 16A, BGW 8A replaces the PDP address assigned by GGSN 12 with a PDP address allocated from a PDP address pool maintained by BGW 8A. The PDP address pool may comprise a subnet of PDP addresses. For example, the PDP address pool may comprise IP addresses in subnet 30.1/16. In some aspects, BGW 8A queries a DHCP server for an assignable PDP address. BGW 8A adds the assigned PDP address to the record for mobile device 16A. In addition, BGW 8A advertises the assigned PDP address using a routing protocol, e.g., Border Gateway Protocol (BGP), to PDN 14.

BGW 8A forwards the modified Activate PDP Context Accept message to mobile device 6A, which adds the BGW-assigned PDP address to the now-active PDP context on the mobile device 16A. Mobile device 16A thereafter uses the BGW-assigned PDP address as the source address for mobile data traffic sent according to the PDP context. In addition, mobile device 16A sends mobile data traffic for the PDP context mobile device via the GTP tunnel between RNC 6A and BGW 8A established during the RAB assignment.

When BGW 8A receives mobile data traffic via a GTP tunnel established between RNC 6A and BGW 8A established during a RAB assignment, BGW 8A breaks out the mobile data traffic along breakout data path 29 to PDN 14, which includes communication link 20. That is, BGW 8A decapsulates the packets from the GTP-U header of the GTP tunnel between RNC 6A and SGSN 10 and sends the decapsulated packets to PDN 14. BGW 8A thus causes the mobile data traffic to bypass GPRS core network 7 and elements of backhaul network 4 that are on a forwarding path between BGW 8A and SGSN 10.

Mobile device 16A sources breakout mobile data traffic from a BGW-assigned PDP address. Because BGW 8A advertises the BGW-assigned PDP address to PDN 14, PDN 14 elements route return mobile data traffic destined for the PDP address (e.g., service-related data traffic issuing from server 19) to BGW 8A for forwarding to mobile device 16A along breakout data path 29.

BGW 8A identifies breakout mobile data traffic based on the values stored in the record for mobile device 16A. For example, BGW 8A may identify breakout mobile traffic based on a TEID for an SGSN 10 side of a GTP tunnel between RNC 6A and SGSN 10. As described above, BGW 8A may extract this TEID from a RAB Assignment Request message. In such embodiments, RNC 6A and SGSN 10 may establish a GTP tunnel as part of RAB assignment. To identify breakout mobile data traffic, BGW 8A inspects and performs deep packet inspection of GTP packets traversing BGW 8A over the GTP tunnel between RNC 6A and SGSN 10.

In some embodiments, BGW 8A identifies breakout mobile data traffic based on a source PDP address for the mobile data traffic. In such embodiments, if the mobile data traffic is sourced by a BGW-assigned PDP address, then BGW 8A breaks out the mobile data traffic along breakout data path 29.

In some embodiments, SGSN 10 may request RAB assignment from RNC 6A prior to requesting PDP context creation from GGSN 12.

For mobile data traffic, received by BGW 8A from RNC 6A, that does not include properties that identify the traffic as breakout mobile data traffic, BGW 8A forwards the mobile data traffic along an IP forwarding path to SGSN 10. BGW 8A may receive the mobile data traffic while forwarding the traffic through a GTP tunnel between RNC 6A and SGSN 10. Such mobile data traffic ultimately traverses GPRS core network 7 to PDN 14 via communication link 22. In addition, BGW 8A continues to forward mobile control traffic (i.e., GTP-C packets) comprising signaling information to GPRS core network 7 for both breakout and standard mobile data traffic.

In some embodiments, mobile device 16A has a static PDP address that mobile device 16A includes in an Activate PDP Context Request message to SGSN 10. The static PDP address may be used by mobile device 16A to source both breakout and standard mobile data traffic. In such instances, mobile device 16A may identify breakout mobile data traffic for mobile device 16A based on TEIDs of a GTP-U header for the traffic, or another value.

In some instances, GPRS core network 7 requests PDP context activation, rather than mobile device 16A. For example, GGSN 12 may receive mobile data traffic for a PDP address for which GGSN 12 does not have an active PDP context. GGSN 12 sends the PDP address to, for example, a Home Location Register (not shown) to obtain a serving SGSN, e.g., SGSN 10, for mobile device 16A associated with the PDP address. GGSN 12 then directs SGSN 10 to send mobile device 16A a Request PDP Context Activation message. In response, mobile device 16 initiates a PDP context activation procedure. BGW 8A applies techniques to the PDP context activation procedure, as described above, to set up breakout data path 29 when the mobile control traffic exhibits one or more breakout properties.

Figure 3:
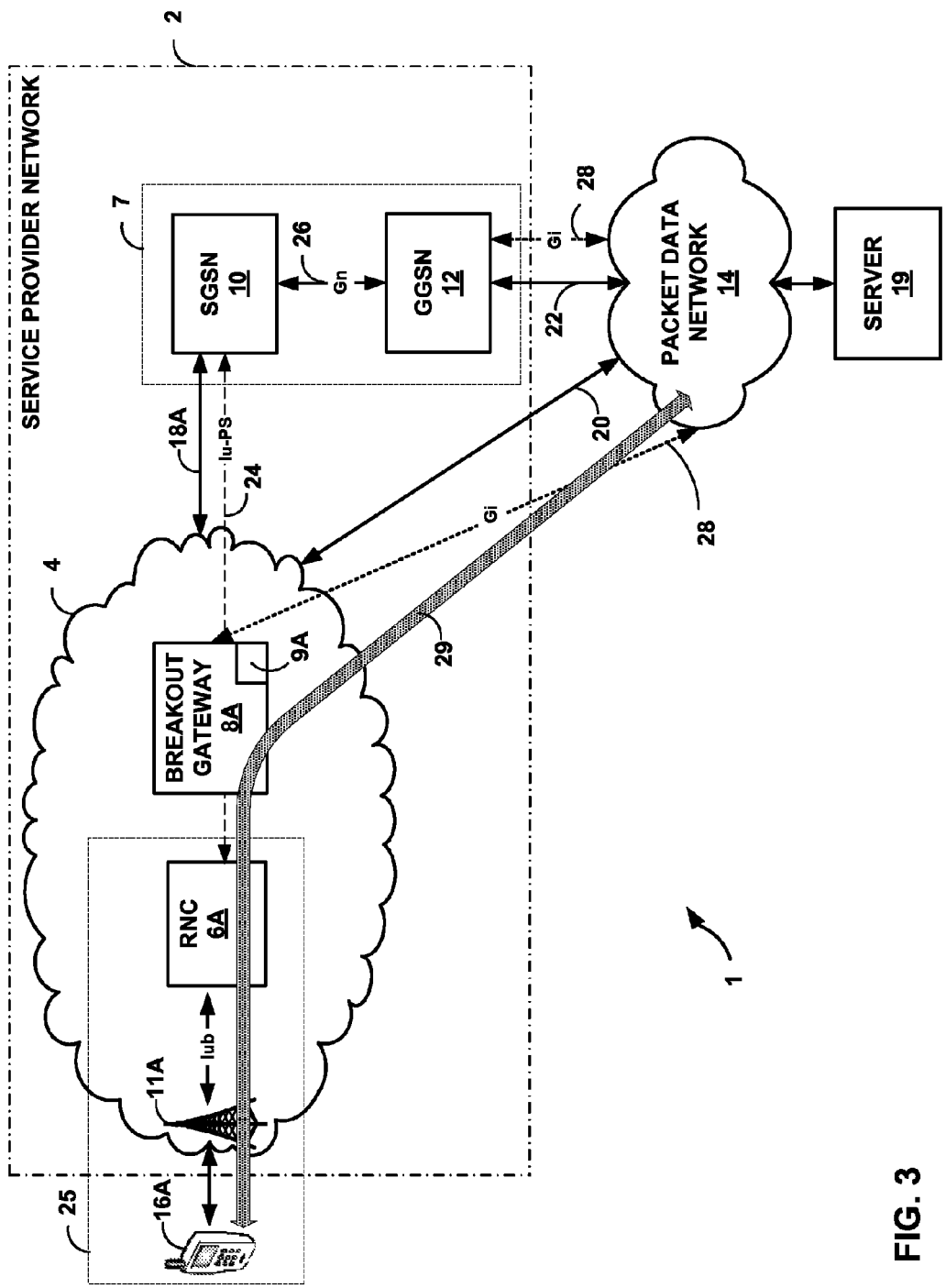
FIG. 3 is a block diagram illustrating a Universal Mobile Telephony Service (UMTS) network having a topology-independent breakout gateway that offloads mobile data traffic from the network according to the techniques of this disclosure.

FIG. 3 is a block diagram illustrating an exemplary embodiment of network system 1 in further detail. The exemplary embodiment illustrated in FIG. 3 includes elements that are substantially similar to elements illustrated by the exemplary embodiment of FIG. 2. For example, FIG. 3 includes GPRS core network 7 having SGSN 10 and GGSN 12, PDN 14, server 19, backhaul network 4, BGW 8A, and UTRAN 24 comprising RNC 6A, base station 11A, and mobile device 16A.

In the illustrated embodiment, BGW 8A includes proxy module 9A to perform proxy-related functions for BGW 8A with respect to both RNC 6A and SGSN 10. Proxy module 9A causes BGW 8A to act as an SGSN 10 proxy for RNC 6A. That is, RNC 6A exchanges packets with BGW 8A as though BGW 8A is SGSN 10. Similarly, proxy module 9A causes BGW 8A to act as an RNC 6A proxy for SGSN 10. That is, SGSN 10 exchanges packets with BGW 8A as though BGW 8A is RNC 6A. By performing these proxy functions, proxy module 9A enables BGW 8A to insert itself into the forwarding paths between RNC 6A and SGSN 10 without modifying the topology of backhaul network 4, thus providing a topology-independent device for performing techniques herein described. BGW 8A is therefore on both the control path and the data path between RNC 6A and SGSN 10.

A core network 7 administrator may configure SGSN 10 to use BGW 8A as an RNC 6A proxy, and a UTRAN 25 administrator may configure RNC 6A to use BGW 8A as an SGSN 10 proxy.

BGW 8A performs such modifications to mobile control traffic in a manner substantially similar to that described above with respect to FIG. 2. Specifically, BGW 8A may inspect Activate PDP Context Accept messages sent from SGSN 10 to RNC 6A and extract relevant field values, such as TEIDs. If the messages include a breakout indicator, BGW 8A may replace the PDP address assigned by GGSN 12 with a PDP address allocated from a PDP address pool maintained by BGW 8A, and then forward the modified message to RNC 6A. BGW 8A advertises the BGW-assigned PDP address to PDN 14. In addition, BGW 8A may snoop RAB Assignment Response messages sent from SGSN 10 to RNC 6A and extract relevant field values. When a message includes a breakout indicator, BGW 8A may replace a GTP user-plane source address carried by the message with an IP address of BGW 8A, and then forward the modified message to RNC 6A to establish a GTP tunnel with RNC 6A. The GTP user-plane source address is typically carried in a type-length-value (TLV) field of the RAB Assignment Response message. The address value of the GTP user-plane source address field causes the recipient of the RAB Assignment Response message, e.g., RNC 6A, to send mobile data traffic for the bearer to the device, e.g., BGW 8A, having the address value. The GTP user-plane source address is alternately referred to herein as a source address of the RAB Assignment Response message. Similarly, a GTP user-plane destination address carried by a RAB Assignment Response message or RAB Assignment Request message is alternately referred to herein as a destination address of the respective message.

BGW 8A performs other functions substantially similarly to the BGW 8A of FIG. 2. For example, BGW 8A may break out mobile data traffic that is received via a GTP tunnel between RNC 6A and BGW 8A onto breakout data path 29 to PDN 14. In addition, BGW 8A may send mobile data traffic received from PDN 14 on breakout data path 29 to RNC 6A via the GTP tunnel between RNC 6A and BGW 8A.

In some embodiments, BGW 8A inspects mobile data traffic from Iu-PS interface 24 traversing the forwarding path between RNC 6A and SGSN 10. If the mobile data traffic is sourced by a BGW-assigned PDP address, BGW 8A breaks out the traffic to PDN 14 on breakout data path 29 via Gi interface 28 operating over communication link 20. PDN 14 elements route mobile data traffic destined for the PDP address (e.g., service-related data traffic issuing from server 19) to BGW 8A for forwarding to mobile device 16A along breakout data path 29.

Figure 4:
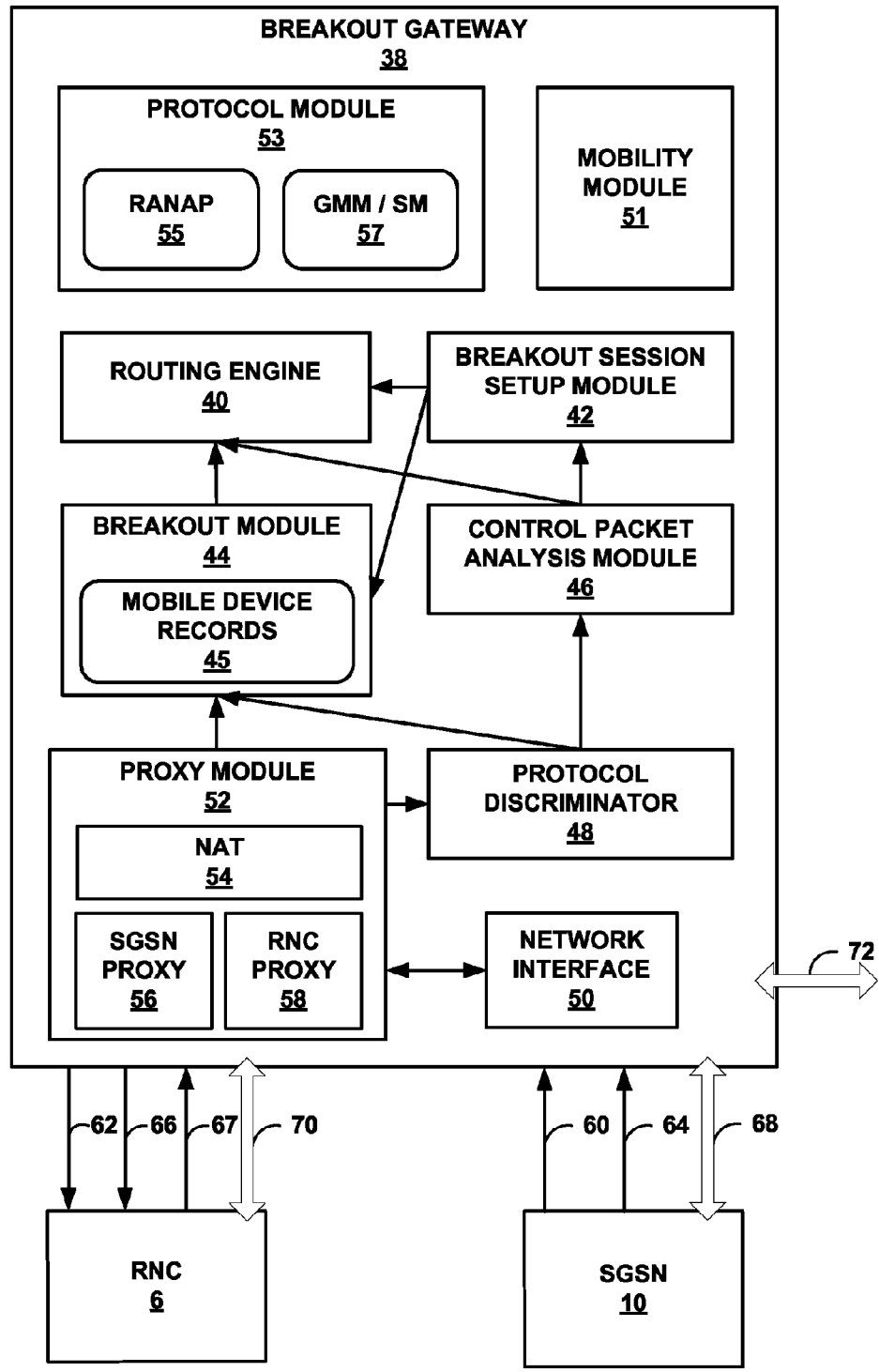
FIG. 4 is a block diagram illustrating an exemplary breakout gateway of FIG. 3 in further detail.

FIG. 4 is a block diagram illustrating breakout gateway 38 ("BGW 38"), an exemplary embodiment of BGW 8A of FIG. 3, communicatively coupled to RNC 6 and SGSN 10. BGW 38 includes proxy module 52 to perform the proxy functionality of a topology-independent breakout gateway. Proxy module 52 includes SGSN proxy 56 to operate as an intermediary for communications from RNC 6 to SGSN 10 and thereby enable BGW 38 to act as a proxy for SGSN 10 to RNC 6. That is, RNC 6 addresses communications intended for SGSN 10 to SGSN proxy 56. Proxy module 52 also includes RNC proxy 58 to operate as an intermediary for communications from SGSN 10 to RNC 6 and thereby enable BGW 38 to act as a proxy for RNC 6 to SGSN 10. That is, SGSN 10 addresses communications intended for RNC 6 to RNC proxy 58. Network address translation module 54 ("NAT 54") maintains records of network addresses for RNC 6 and SGSN 10 in a translation table. When SGSN proxy 56 receives a packet from RNC 6 intended for SGSN 10, NAT 54 maps the destination address of the packet to a network address of SGSN 10 using the translation table. NAT 54 may also replace the source address for the packet with an address of RNC proxy 58. Similarly, when RNC proxy 58 receives a packet from SGSN 10 intended for RNC 6, NAT 54 maps the destination address of the packet to a network address of RNC 6 using the translation table. NAT 54 may also replace the source address for the packet with an address of SGSN proxy 56. In some examples, NAT 54 performs network address port translation. In this way, proxy module 52 enables BGW 38 to insert itself into the forwarding paths between RNC 6 and SGSN 10. Control and data messages exchanged between RNC 6 and SGSN 10 therefore traverse BGW 38.

BGW 38 also includes network interface 50, routing engine 40, and protocol module 53 to facilitate sending and receiving communications over Iu-PS interface 24 and Gn interface 26 for BGW 8. Network interface 50 is coupled to one or more wired or wireless communication links (not shown) that transport communications for the interfaces. Routing engine 40 performs PDP (e.g., IP) routing and forwarding functions for BGW 38, including managing a routing information base, executing routing protocols, and controlling BGW 38 interfaces (e.g., network interface 50). For example, routing engine 40 may support the Internet Protocol and execute one or more IP-based routing protocols, such as Open Shortest Path First (OSPF), Routing Information Protocol (RIP), and Border Gateway Protocol (BGP). Routing engine 40 may receive route advertisements from other PDP-capable routers carrying routing information that routing engine 40 maintains. In addition, routing engine 40 may leverage existing routes to generate and install additional routes to network locations identified by PDP addresses assigned by BGW 38, then advertise such routes during routing protocol execution.

BGW 38 uses Radio Access Network Application Part (RANAP) protocol 55 of protocol module 53 over Iu-PS interface 24 to perform signaling between an access network, such as UTRAN 25, and a core network, such as GPRS core network 7. Global mobility management/session management ("GMM/SM") protocols 57 of protocol module 53 operate over RANAP protocol 55 to support mobility management for mobiles devices.

In accordance with the techniques of this disclosure, BGW 38 comprises breakout session setup module 42, breakout module 44, control packet analysis module 46, protocol discriminator 48, and mobility module 51.

In this aspect, BGW 38 operates as an element of a GPRS-based service provider network. Accordingly, mobile data traffic traverses BGW 38 via GTP tunnels established between various elements of the service provider network, including BGW 38. In addition, BGW 38 receives mobile control traffic via RANAP. Protocol discriminator 48 receives mobile traffic from proxy module 52 and determines a carrier protocol for the traffic. Protocol discriminator 48 transfers mobile data traffic carried by GTP-U tunnels to breakout module 44 and transfers mobile control traffic carried by RANAP to control packet analysis module 46. Protocol discriminator 48 also transfers user-level PDP packets to breakout module 44.

Control packet analysis module 46 receives mobile control traffic and sends control messages therein to breakout session setup module 42. Control packet analysis module 46 may send filtered control traffic to proxy module 9 for transmission to the appropriate destination device via network interface 50. Breakout session setup module 42, in accordance with the described techniques, inspects and/or modifies the control messages to establish a breakout data path for data traffic associated with a PDP context identified in the control messages. Some of the control messages inspected and/or modified include GPRS Attach Request, GPRS Attach Accept, Activate PDP Context Accept, RAB Assignment Request, and RAB Assignment Response messages.

For example, SGSN 10, in response to an Activate PDP Context Request message from a mobile device, sends BGW 38, operating as a proxy for RNC 6, an Activate PDP Context Accept message 60 destined for the mobile device. SGSN 10 sends Activate PDP Context Accept message 60 to activate a PDP context and to attempt to relay a PDP address, assigned by a GGSN, to the mobile device for the PDP context. RNC proxy 58 receives Activate PDP Context Accept message 60 via network interface 50 and sends the message to protocol discriminator 48. Protocol discriminator 48 determines from a RANAP header encapsulating Activate PDP Context Accept message 60 that the message is mobile control traffic. Accordingly, protocol discriminator 48 forwards Activate PDP Context Accept message 60 to control packet analysis module 46, which forwards the message to breakout session setup module 42.

Breakout session setup module 42 inspects Activate PDP Context Accept message 60 and determines whether any field values of the message match a breakout indicator value. If Activate PDP Context Accept message 60 exhibits a breakout indicator, breakout session setup module 42 may modify Activate PDP Context Accept message 60 to replace an assigned PDP address value with a PDP address from an address pool that breakout session setup module 42 maintains. Breakout session setup module 42 sends the BGW-assigned PDP address to routing engine 40, which advertises to peer routers the PDP address or a prefix thereof as a destination subnet for which BGW 38 offers connectivity. In addition, breakout session setup module 42 sends the BGW-assigned PDP address to breakout module 44, which stores the PDP address in one of mobile device records 45 for the destination mobile device identified in Activate PDP Context Accept message 60. Breakout module 44 may query mobile device records 45 to determine the destination mobile device associated with a destination PDP address for downstream mobile data traffic received by BGW 38.

After replacing the PDP address, breakout session setup module 42 sends the modified Activate PDP Context Accept message 62 to proxy module 52 for transmission to RNC 6 via network interface 50. If original Activate PDP Context Accept message 60 does not exhibit any breakout indicators, breakout session setup module 42 sends Activate PDP Context Accept message 60 to proxy module 52 for relay to SGSN 10 via network interface 50.

As another example, SGSN 10 sends BGW 38, operating as a proxy for RNC 6, a RAB Assignment Request message 64 to attempt to create a radio access bearer between the mobile device and SGSN 10. RNC proxy 58 receives RAB Assignment Request message 64 via network interface 50 and sends the message to protocol discriminator 48. Protocol discriminator 48 determines from a RANAP header encapsulating RAB Assignment Request message 64 that the message is mobile control traffic. Accordingly, protocol discriminator 48 forwards RAB Assignment Request message 64 to control packet analysis module 46, which forwards the message unfiltered to breakout session setup module 42.

Breakout session setup module 42 inspects RAB Assignment Request message 64 and determines whether any field values of the message match a breakout indicator value. If RAB Assignment Request message 64 exhibits a breakout indicator, breakout session setup module 42 may modify RAB Assignment Request message 64 to replace a GTP user-plane address carried by the message with an IP address of BGW 38 (e.g., an address for SGSN proxy 56). In such instances, breakout session setup module 42 additionally extracts the original source and destination IP addresses of the message, as well as an upstream TEID that identifies an SGSN 10 side of a GTP tunnel that SGSN 10 is attempting to establish with RAB Assignment Request message 64 to RNC 6. Breakout session setup module 42 sends the extracted values to breakout module 44 for storage in one of mobile device records 45 for the destination mobile device identified in RAB Assignment Request message 64. Breakout session setup module 42 sends the modified RAB Assignment Request message 66 to proxy module 52 for transmission to RNC 6 via network interface 50. If original RAB Assignment Request message 64 does not exhibit any breakout indicators, breakout session setup module 42 sends RAB Assignment Request message 64 to proxy module 52 for relay to SGSN 10 via network interface 50.

RNC 6 responds to modified RAB Assignment Request message 66 by establishing a RAB for the PDP context and returning RAB Assignment Response message 67 to BGW 38 by addressing the message to the modified GTP user-plane address received in modified RAB Assignment Request message 66. SGSN proxy 56 receives RAB Assignment Response message 67 via network interface 50 and sends the message to protocol discriminator 48, which determines that the RAB Assignment Response message 67 is mobile control traffic and sends the message to control packet analysis module 46. Control packet analysis module 46 passes the message unfiltered to breakout session setup module 42, which extracts a downstream TEID for the RAB and sends the downstream TEID to breakout module 44 for storage in one of mobile device records 45 for the mobile device identified in RAB Assignment Response message 67.

Using data provided by breakout session setup module 42, breakout module 44 analyzes mobile data traffic received by or otherwise traversing BGW 38 and determines from mobile device records 45 whether to bypass SGSN 10 by forwarding the mobile data traffic on a breakout data path to a packet data network.

Mobile device records 45 store session data for one or more mobile devices served by BGW 38. Mobile device records 45 may comprise a table, database, linked list, or other data structure. In some embodiments, a server, such as a Home Location Register (HLR), stores mobile device records 45 that BGW 38 may query for session data for a particular subscriber and/or mobile device. Mobile device records 45 may include data for a PDP context for a mobile device, including a PDP address and accompanying Network-layer Service Access Point Identifier (NSAPI), an IMSI, a P-TMSI, an SCCP connection identifier, a downstream TEID (extracted from RAB Assignment Response message 67) for the RNC 6 side of a GTP tunnel terminated by RNC 6 that serves the mobile device, an upstream TEID (extracted from RAB Assignment Request message 64) for the SGSN 10 side of the GTP tunnel, and a RAB identifier for a RAB to RNC 6.

In one example operation, SGSN proxy 56 receives mobile data traffic 70 from RNC 6 via network interface 50 and sends the traffic to protocol discriminator 48. Protocol discriminator 48 determines from a GTP header that mobile data traffic 70 is GTP-U traffic and transfers mobile data traffic 70 to breakout module 44. Breakout module 44, in turn, analyzes mobile data traffic 70 to determine whether to forward the traffic along a breakout data path rather than forward the traffic to SGSN 10. For instance, breakout module 44 may attempt to match a TEID of the GTP header for mobile data traffic 70 to a TEID stored in mobile device records 45. In another instance, breakout module 44 may attempt to match a different property value in the GTP header, or in a header for a protocol other than GTP for mobile data traffic 70, to an identifier in mobile device records 45. For example, breakout module 44 may attempt to match an IP-header field value of the packet sourced by the mobile device. In another instance, breakout module 44 identifies mobile data traffic 70 that is to be forwarded along a breakout data path by determining that BGW 38 terminates the GTP tunnel through which mobile data traffic 70 is received. That is, breakout module 44 determines that mobile data traffic 70 is addressed, in a network header, to BGW 38.

If breakout module 44 matches a property (e.g., a TEID of a GTP header or an IP-header field value) of mobile data traffic 70 to an identifier in mobile device records 45 or determines that BGW 38 terminates the GTP tunnel, breakout module 44 then directs routing engine 40 to forward the traffic along a breakout data path. In one example implementation, breakout module 44 strips packets constituting mobile data traffic 70 of the GTP, UDP/TCP, and IP headers to reveal user data packets encapsulated by a PDP header (e.g., an IP header for an IP-based packet data network) that includes a destination PDP address for a remote packet data network, such as the Internet or a layer 3 VPN. Routing engine 40 forwards these PDP packets to a destination remote packet data network according to routing and/or forwarding information that routing engine 40 stores for BGW 38. In another example implementation, breakout module 44 encapsulates the user data packets with a PDP header that includes a destination address that breakout module 44 explicitly sets prior to sending newly formed PDP packets to routing engine 40. Routing engine 40 forwards the PDP packets to the remote packet data network as PDP traffic 72. As a result, BGW 38 operates to send mobile data traffic to a remote packet data network along a breakout data path, enabling the mobile data traffic to bypass elements, such as SGSN 10, of a mobile core network. As used herein, "encapsulation" may refer to both a packet header and footer, to a packet header only, or to a packet footer only.

If breakout module 44 fails to match a property of mobile data traffic 70 to an identifier in mobile device records 45, breakout module 44 sends mobile data traffic 70 to routing engine 40 for forwarding to SGSN 10, along a GTP tunnel between RNC 6 and SGSN 10, as mobile data traffic 68. As a result, outbound mobile data traffic 68 does not bypass mobile core elements in the manner of PDP traffic 72. In some instances, to forward the mobile data traffic 70, NAT 54 replaces the destination address of mobile data traffic 70 with a destination address of SGSN 10. In addition, NAT 54 may replace the source address of mobile data traffic 70 with an IP address for the BGW 38. Routing engine 40 forwards the modified data traffic to SGSN 10 as outbound mobile data traffic 68.

In another example operation, network interface 50 receives PDP traffic 72 and sends the traffic to protocol discriminator 48, which forwards the traffic to breakout module 44. In this instance, mobile device records 45 stores data for PDP contexts for mobile devices served by RNC 6. Breakout module 44 attempts to match the destination PDP address of PDP traffic 72 to a PDP address stored by one of mobile device records 45. Upon determining one of mobile device records 45 that includes a matching PDP address, breakout module 44 obtains from the matching record a downstream TEID for a GTP tunnel between RNC 6 and BGW 38 and an IP address for RNC 6, where RNC 6 serves the mobile device identified by the destination PDP address of PDP traffic 72. Breakout module 44 encapsulates packets constituting PDP traffic 72 with a GTP header that comprises the downstream TEID, a transport header, and an IP header comprising the IP address of RNC 6. Breakout module 44 sends the encapsulated packets to routing engine 40 for forwarding to RNC 6, via the GTP tunnel between RNC 6 and BGW 38, as mobile data traffic 70. In this manner, BGW 38 operates as a gateway to a mobile network while enabling mobile data traffic 70 to bypass elements of the mobile network core, such as SGSN 10.

In another example operation, RNC proxy 58 receives mobile data traffic 68 from SGSN 10 via network interface 50. In this instance, NAT 54 replaces the destination address of mobile data traffic 68 with a destination address of RNC 6. Routing engine 40 forwards the modified data traffic to RNC 6 as mobile data traffic 70.

As described in detail with respect to FIGS. 10-15, mobility module 51 enables BGW 38 to migrate session data to other breakout gateway devices, tunnel mobile data and control traffic to other breakout gateway devices, and communicate configuration data to other breakout gateway devices to allow mobile devices to migrate among RNCs of a network without experiencing interruptions in connectivity.

Figure 5:
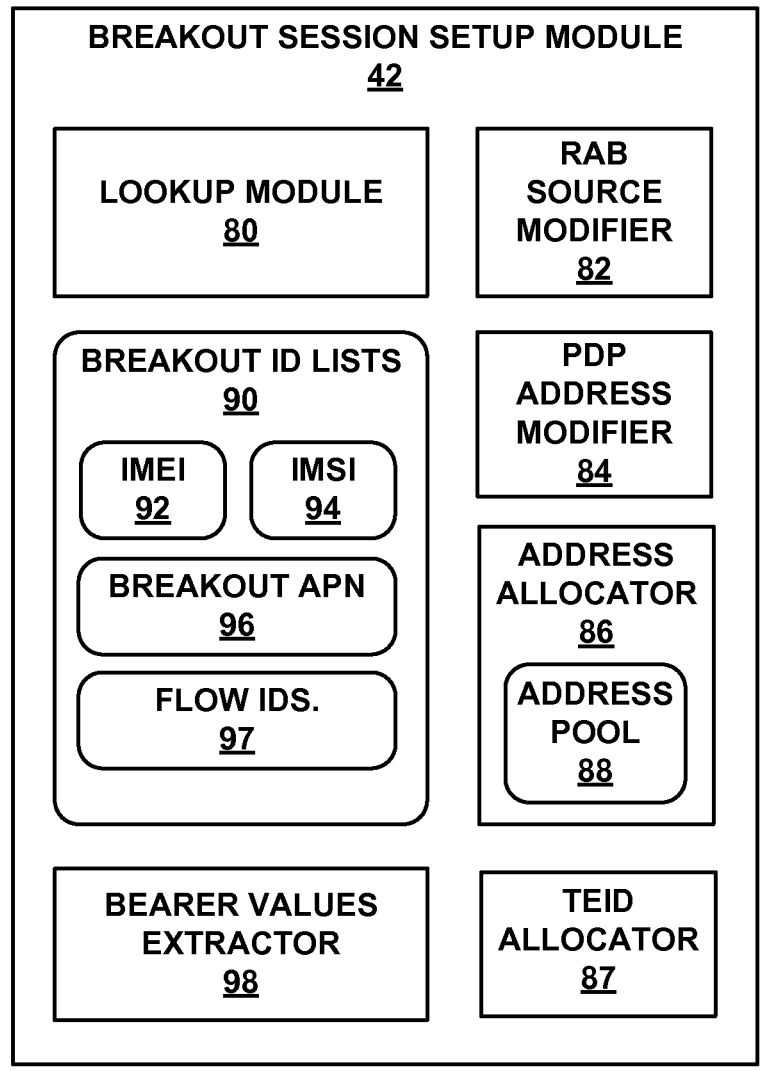
FIG. 5 is a block diagram illustrating, in detail, an exemplary breakout session setup module of the breakout gateway of FIG. 4.

FIG. 5 is a block diagram illustrating breakout session setup module 42 of FIG. 4 in further detail. Breakout session setup module 42 comprises lookup module 80, RAB source modifier 82, PDP address modifier 84, bearer values extractor 98, and breakout identifier lists 90 ("breakout ID lists 90"). Breakout identifier lists 90 includes values for control message properties specifying that BGW 38 may break out mobile data traffic associated with the control message along a breakout data path. In the illustrated embodiment, breakout identifier lists 90 includes IMEI list 92 ("IMEI 92") comprising a list of IMEIs for one or more mobile devices, IMSI list 94 ("IMSI 94") comprising a list of IMSIs for one or more subscribers, and breakout APN list 96 ("breakout APN 96") comprising a list of service identifiers for one or more services.

Lookup module 80 analyzes mobile control traffic traversing or otherwise received by BGW 38 and determines whether the mobile control traffic exhibits one or more breakout indicators. In this example, lookup module 80 inspects IMEI, IMSI, flow identification information, and/or APN property values of mobile control traffic messages and compares them to values stored in one of breakout ID lists 90 (that is, IMEI list 92, IMSI list 94, breakout APN list 96, and flow identifiers 97 ("flow IDs 97")). If lookup module 80 determines that a property value for a mobile control traffic message matches a value stored in one of breakout ID lists 90, lookup module passes a copy of the mobile control traffic message to either RAB source identifier 82 (in the instance of a RAB Assignment Request message), PDP address modifier 84 (in the instance of an Activate PDP Context Accept message), and/or bearer values extractor 98 (in all instances of mobile control traffic messages). In some embodiments, lookup module 80 communicates with a policy server that stores one or more policies to determine whether breakout session setup module 42 should create a breakout session for mobile data traffic corresponding to the mobile control traffic.

Bearer values extractor 98 extracts property values from mobile control traffic messages and sends the extracted values to breakout module 44 for storage in entry of mobile device records 45. In this example, bearer values extractor 98 extracts, from GPRS Attach Request messages, one or more identifiers for requesting mobile devices, such as an IMSI, a packet-temporary mobile subscriber identity (P-TMSI), or an SCCP connection identifier. In addition, bearer values extractor 98 extracts the source and destination IP addresses of RAB Assignment Request messages, as well as upstream TEIDs that identify an SGSN side of a GTP tunnel. TEID allocator 87 allocates a new TEID and replaces the upstream TEID in the RAB Assignment Request message with the newly allocated TEID. As a result, the new bearer is specific to the BGW allocating the TEID. Upon receiving GTP-U packets, breakout module 44 of BGW 38 maps the BGW-allocated TEID to the SGSN-allocated TEID for upstream traffic, and vice-versa for downstream traffic.

In addition, bearer values extractor 98 extracts downstream TEIDs from RAB Assignment Response messages.

RAB source modifier 82 replaces the source IP address of RAB Assignment Request messages that exhibit a breakout indicator with an IP address of BGW 38. In this way, an RNC may establish a GTP-U tunnel with BGW 38.

Address allocator 86 maintains address pool 88, a set of PDP addresses for which BGW 38 advertises itself as offering connectivity. In some instances, the set of a PDP addresses is a subnet within the PDP address space. In some embodiments, address allocator 86 requests PDP addresses from a server, such as a DHCP server. Address allocator 86 provides an available PDP address for a mobile device from address pool 88 to further breakout session setup. In some instances, address allocator 86 provides an available PDP address for a mobile device after accounting, according to the 3GPP specification, for a "Routing-Area or the Physical Location" of the RNC with the Routing-Area-Indicator information. In this instance, address allocator 86 allocates a PDP address for the mobile device from a particular subnet that is associated with the determined location.

PDP address modifier 84 replaces an assigned PDP address for a mobile device in Activate PDP Context Accept messages that exhibit a breakout indicator with a PDP address that PDP address modifier 84 requests from address allocator 86. A mobile device that receives a modified Activate PDP Context Accept message uses, as a source address, the PDP address assigned allocated by address allocator 86, rather than a PDP address assigned by a GGSN. As a result, return mobile data traffic is routed to BGW 38, thereby bypassing the GGSN and other elements of the mobile core network.

Figure 6:
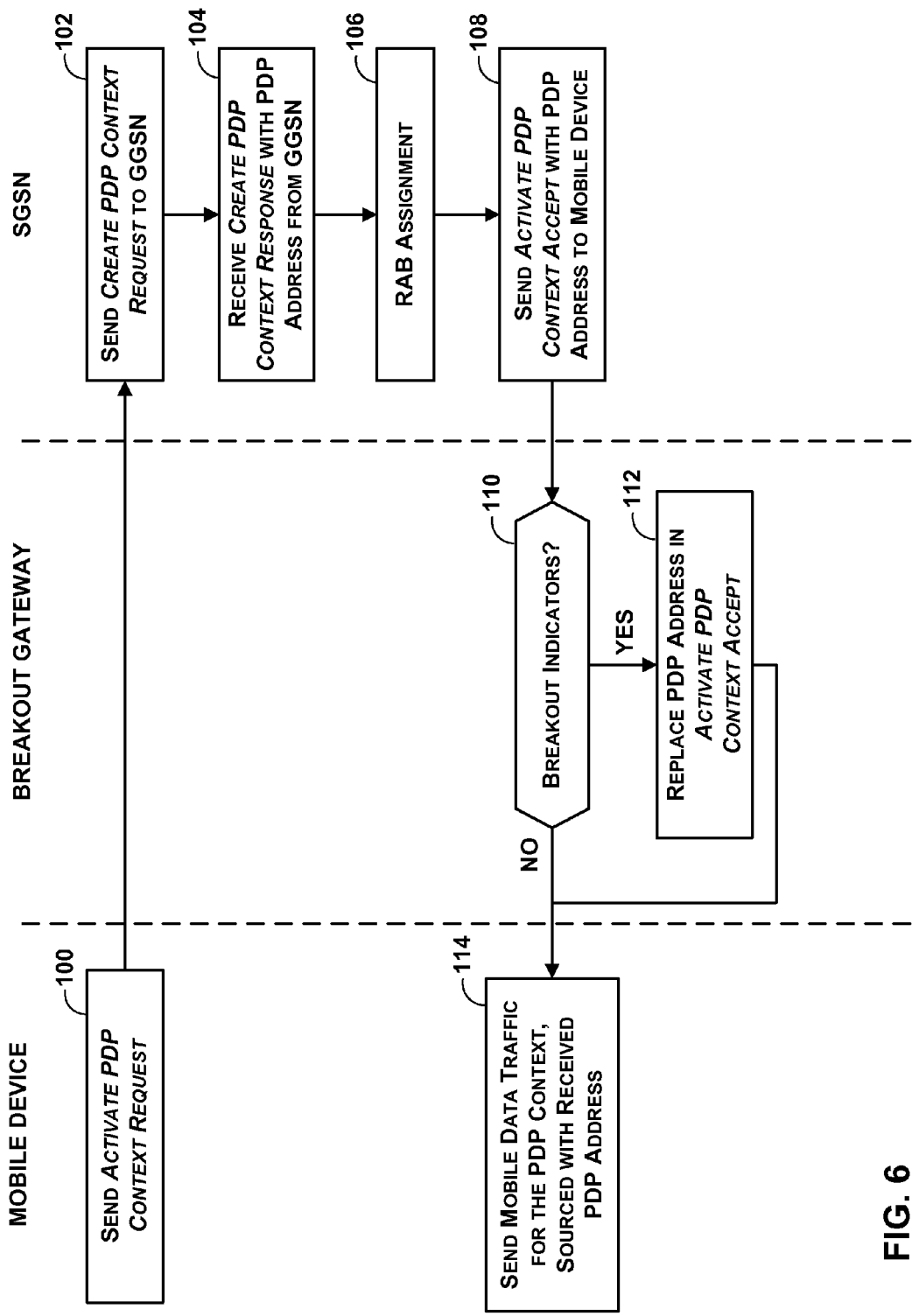
FIG. 6 is a flowchart illustrating exemplary modes of operation of elements of a mobile service provider network for setting a PDP address for a mobile device to a PDP address locally routable by a breakout gateway according to the described techniques.

FIG. 6 is a flowchart illustrating exemplary modes of operation of elements of a mobile service provider network, including BGW 38 of FIG. 4, for setting a PDP address for a mobile device to a PDP address locally routable by BGW 38 according to the described techniques.

The mobile device sends an SGSN an Activate PDP Context Request message that traverses BGW 38 on a forwarding path from the mobile device to an SGSN (100). In response, the SGSN sends a Create PDP Context Request message to a GGSN (102), which may respond, in Create PDP Context Response, with an assigned PDP address for the mobile device (104). In addition, the SGSN establishes a radio access bearer with the mobile device by performing a RAB assignment process in cooperation with an RNC and with the mobile device (106). The SGSN forwards the GGSN-assigned PDP address to the mobile device in an Activate PDP Context Accept message (108).

Network interface 50 receives the Activate PDP Context Accepts message and sends the message to breakout session setup module 42. Lookup module 80 determines whether the message exhibits one or more breakout indicators (110), such as an APN that matches a breakout APN in breakout APN list 96 of BGW 38. If the message exhibits a breakout indicator (NO branch of 110), PDP address modifier 84 obtains a PDP address served by BGW 38 (i.e., a PDP address for which BGW 38 advertises itself as offering connectivity) from address allocator 86. PDP address modifier 84 then replaces the GGSN-assigned PDP address with the BGW-served PDP address (112).

BGW 38 forwards the Activate PDP Context Accepts message to the mobile device via network interface 50. The mobile device, thereafter, uses the PDP address (whether assigned by the GGSN or BGW 38) as a source address for mobile data traffic that mobile device may send to a packet data network (114).

Figure 7:
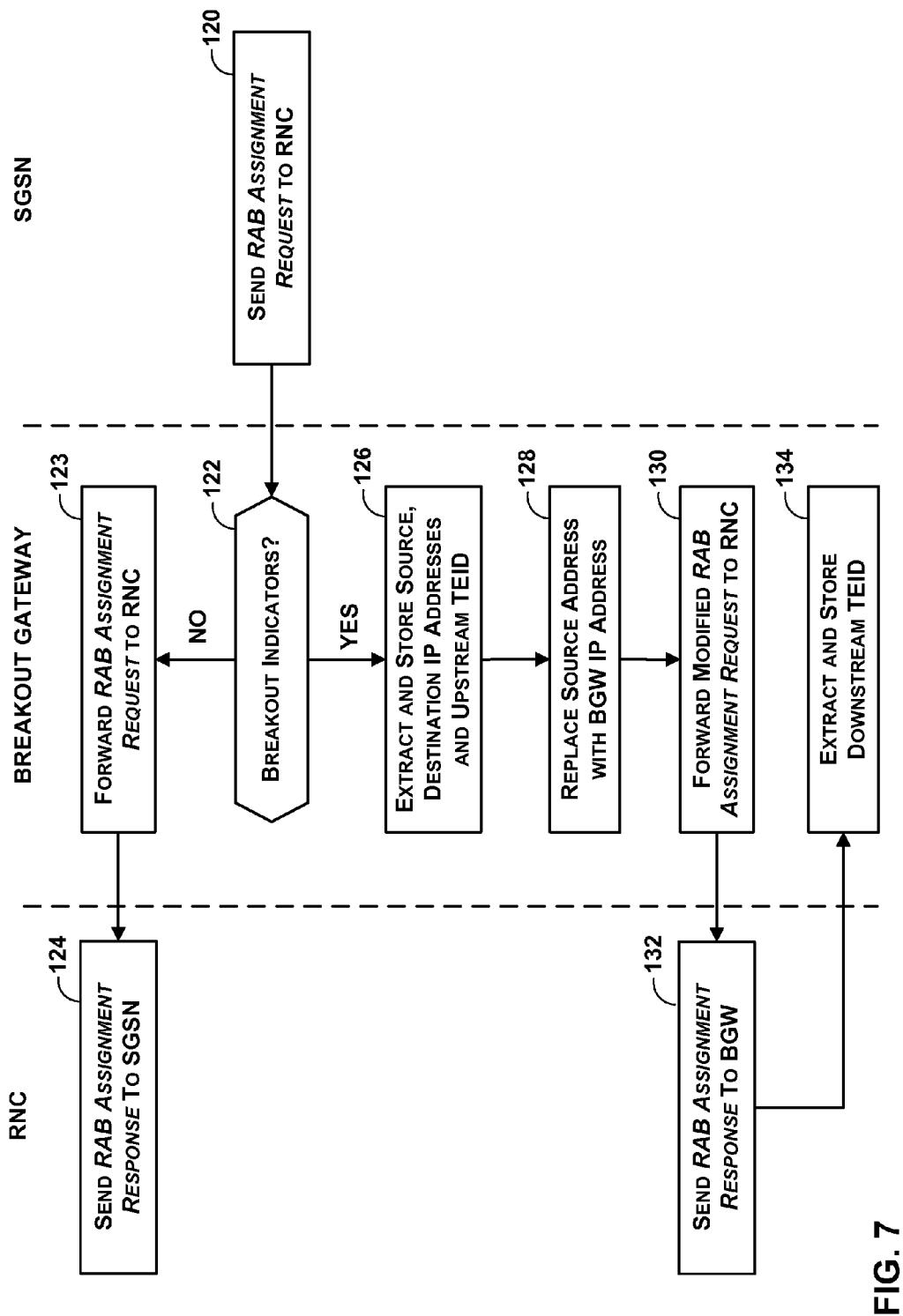
FIG. 7 is a flowchart illustrating exemplary modes of operation for elements of a mobile service provider network for establishing a tunnel between an RNC that serves a mobile device and a breakout gateway in accordance with the techniques herein described.

FIG. 7 is a flowchart illustrating exemplary modes of operation for elements of a mobile service provider network, including BGW 38 of FIG. 4, for establishing a GTP tunnel between an RNC that serves a mobile device and BGW 38 to enable BGW 38 to direct mobile data traffic along a breakout data path in accordance with the described techniques.

SGSN sends a RAB Assignment Request message to an RNC that serves a mobile device to initiate tunnel establishment for a PDP context (120). Network interface 50 of BGW 38 receives the message and lookup module 80 of breakout session setup module 42 determines whether the message exhibits one or more breakout indicators (122), such as an APN that matches a breakout APN in breakout APN list 96 of BGW 38. If not (NO branch of 122), BGW 38 forwards the RAB Assignment Request message to the RNC (123). The RNC sends a RAB Assignment Response message to the SGSN (124).

If the RAB Assignment Request message exhibits one or more breakout indicators (YES branch of 122), bearer values extractor 98 extracts the source and destination IP addresses of the message from the message (126). Bearer values extractor 98 also extracts a TEID (the "upstream TEID") from the message for the SGSN side of a GTP tunnel sought to be established by the SGSN (126). Breakout module 44 stores the extracted values in a record in mobile device records 45 for the mobile device session (126).

RAB source modifier 82 replaces the source IP address of the RAB Assignment Request message with an IP address of BGW 38 (128), and network interface 50 sends the modified message to the RNC (130). As a result, RNC considers BGW 38 to be the requesting SGSN. RNC therefore responds to the modified RAB Assignment Request message with a RAB Assignment Response message to BGW 38 (132). Bearer values extractor 98 extracts a TEID (the "downstream TEID") from the RAB Assignment Response message for the RNC side of a GTP tunnel that BGW 38 now terminates, and breakout module 44 stores the downstream TEID in a record in mobile device records 45 for the mobile device session. Having completed this mode of operation according to the described techniques, BGW 38 may communicate directly with the RNC via a GTP-U tunnel for the mobile device session by querying the corresponding record in mobile device records 45.

Figure 8:
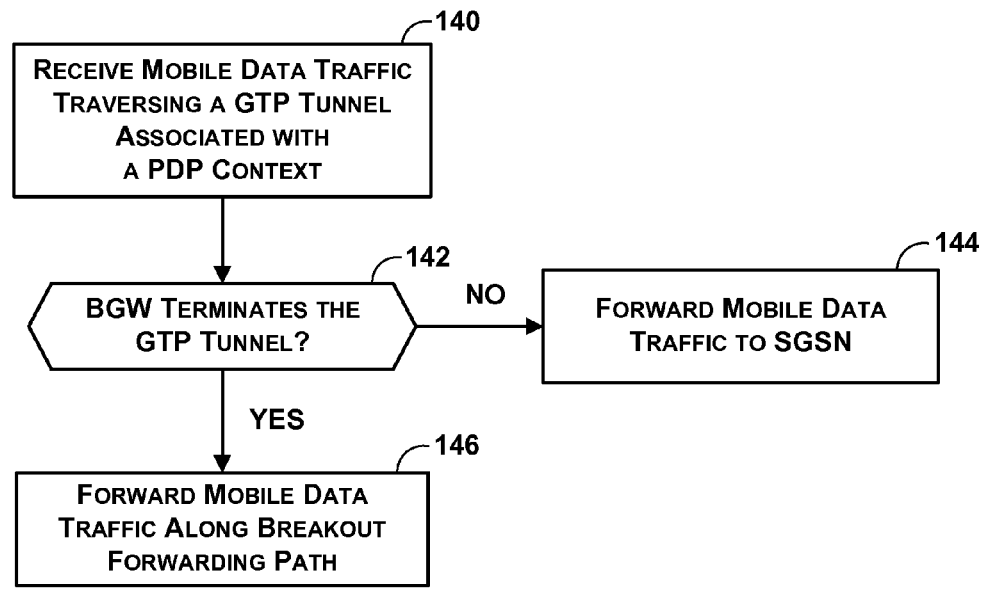
FIG. 8 is a flowchart illustrating an exemplary mode of operation of a breakout gateway for breaking out mobile data traffic from a mobile service provider network according to the techniques of this disclosure.

FIG. 8 illustrates an exemplary mode of operation for BGW 38 of FIG. 4. Network interface 50 received mobile data traffic traversing or otherwise received by BGW 38 in a GTP tunnel (140). If BGW 38 does not terminate the tunnel (NO branch of 142), then breakout module 44 forwards the mobile data traffic to the SGSN that terminates the tunnel (144). However, if the mobile data traffic is addressed, in a network header, to BGW 38, then BGW 38 terminates the tunnel (YES branch of 142), and breakout module 44 forwards the mobile data traffic to the mobile data traffic destination via a breakout data path to a packet data network, such as the Internet or a layer 3 VPN (146).

Figure 9:
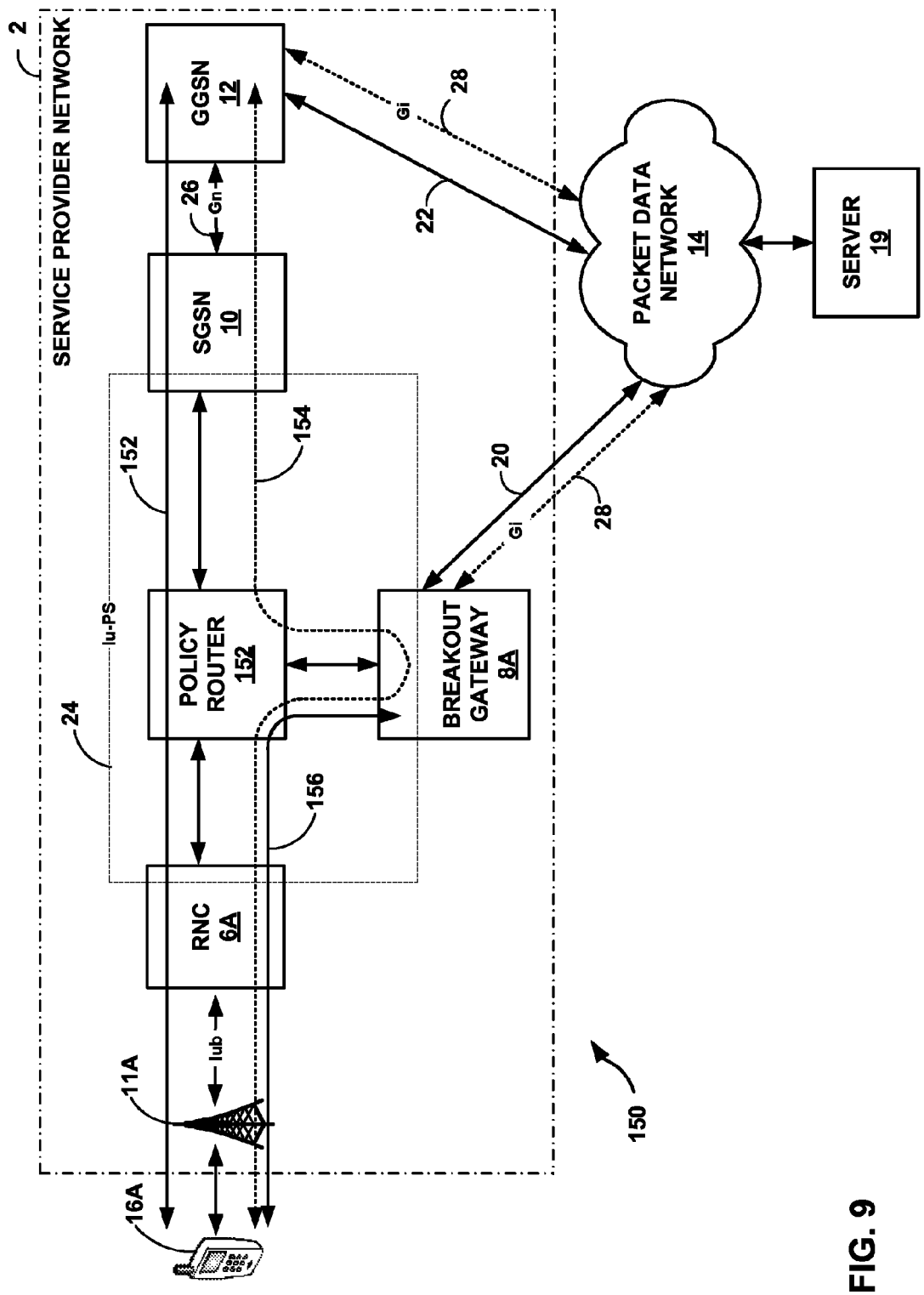
FIG. 9 is a block diagram illustrating an exemplary embodiment of the UMTS network of FIG. 2 that includes a policy router to route mobile control traffic to a breakout gateway in accordance with the described techniques.

FIG. 9 is a block diagram that illustrates network system 150, an exemplary embodiment of aspects of system 1 of FIG. 2. Network system 150 additionally comprises a policy router 152 to direct mobile control traffic to BGW 8A and demultiplex outbound mobile data traffic between BGW 8A and SGSN 10. RNC 6A, policy router 152, and SGSN 10 communicate using protocols specified by Iu-PS interface 24. In some embodiments of network system 150, RNC 6A, policy router 152, and SGSN 10 may communicate over Iu-PS interface 24 using ATM. In such instances, policy router 152 extracts IP packets from ATM cells for transmission to BGW 8A, and policy router encapsulates IP packets received from BGW 8A in ATM cells for transmission to RNC 6A or SGSN 10.

Policy router 152 comprises one or more policy rules that dictate the behavior of policy router 152 with respect to mobile data and control traffic. According to the techniques of this disclosure, in one instance, a policy rule of policy router 152 directs policy router 152 to forward all mobile control traffic 154 to BGW 8A. That is, when policy router 152 receives mobile control traffic 154 via Iu-PS interface 24, the policy rule causes policy router 152 to forward the mobile control traffic 154 to BGW 8A over Iu-PS interface 24. In this way, mobile control traffic 154 for mobile device 16A traverses and may be inspected by BGW 8A. In some embodiments, BGW 8A may be co-located with policy router 152. In some embodiments, BGW 8A may be a service card inserted into a policy router 152 chassis.

As described in detail above with respect to FIGS. 4, 5, and 7, during a RAB assignment process between SGSN 10 and RNC 6A, BGW 8A intercepts a RAB Assignment Request message from SGSN 10 to RNC 6A that is routed by policy router 152 to BGW 8A. If the message exhibits a breakout indicator, BGW 8A may replace the source IP address of the message (i.e., an IP address of SGSN 10), with an IP address for BGW 8A. Moreover, BGW 8A may replace an upstream TEID from the message to identify an associated PDP context. BGW 8A then forwards the modified RAB Assignment Request message to policy router 152 for transmission to RNC 6A. As a result, RNC 6A replies to the RAB Assignment Request message with a RAB Assignment Response message to BGW 8A and consequently establishes a radio access bearer with BGW 8A. Thereafter, RNC 6A sends mobile data traffic 156 for the PDP context associated with the modified RAB Assignment Request message to BGW 8A for transmission to PDN 14 along a breakout data path that includes communication link 20. Contrariwise, RNC 6A sends mobile data traffic 152 for PDP contexts associated with the RAB Assignment Request message that are unmodified by BGW 8A to SGSN 10 for transmission to PDN 14 along a standard forwarding path that includes communication link 22.

In addition, as described in detail above with respect to FIGS. 4-6, during a PDP context activation process between elements of network system 150, BGW 8A intercepts an Activate PDP Context Accept message from SGSN 10 to mobile device 16A that is routed by policy router 152 to BGW 8A. If the message exhibits a breakout indicator, BGW 8A may replace the PDP address assigned by GGSN 12 with a PDP address served by BGW 8A. BGW 8A then forwards the modified Activate PDP Context Accept message to policy router 152 for transmission to RNC 6A. As a result, return mobile data traffic to mobile device 16A enters mobile service provider network 2 via BGW 8A, rather than via GGSN 12.

By performing the techniques described above, policy router 152 and BGW 8A may enable an administrator for mobile service provider network 2 to provide breakout functionality using an existing router, policy router 152.

Figure 10:
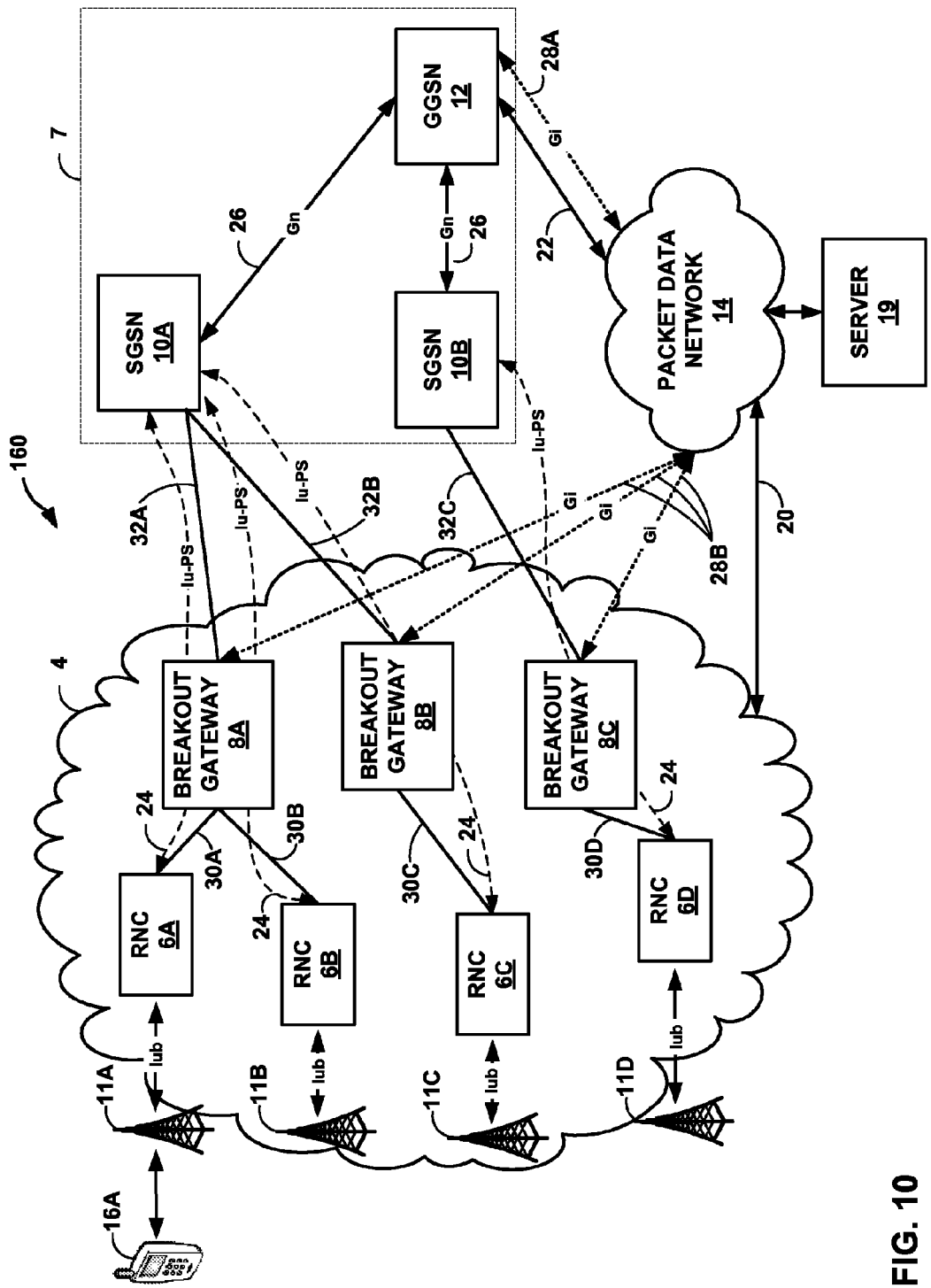
FIG. 10 is a block diagram illustrating a network system having breakout gateways that perform mobility management for a mobile device in accordance with the described techniques.

FIG. 10 is a block diagram illustrating network system 160, an exemplary embodiment of network system 1 of FIG. 2. In network system 160, mobile devices 16A migrates locations during a mobile data session such that mobile device 16A may require service by any of base stations 11A-11B ("base stations 11"). In accordance with the techniques of this disclosure, to maintain service continuity for a breakout mobile data session of mobile device 16A, any of breakout gateways 8A-8C ("BGWs 8") may use mobility information for each of BGWs 8 to perform mobility management functions. Mobility information may include, for example, IP addresses of each of BGWs 8, a list of each of RNCs 6 served by respective ones of BGWs 8, a list of PDP addresses served by respective ones of BGWs 8, and other information.

Figure 11:
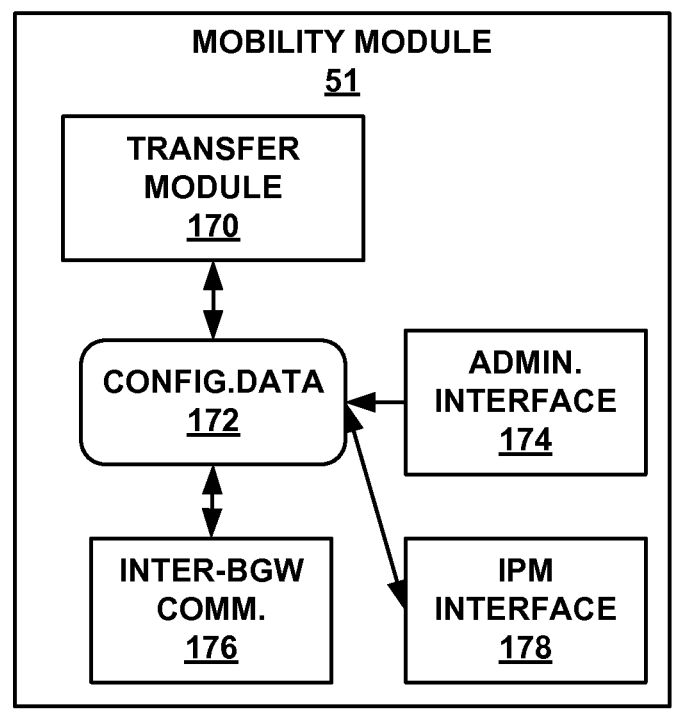
FIG. 11 is a block diagram illustrating, in detail, an exemplary mobility module for the exemplary breakout gateway of FIG. 4.

FIG. 11 is a block diagram illustrating mobility module 51 of BGW 38 of FIG. 4 in further detail. BGW 38 may be an embodiment of one of BGWs 8 of FIG. 10. Mobility module 51 includes transfer module 170, configuration data 172, administrative interface 174, inter-BGW communication module 176 ("inter-BGW comm. 176"), and Identity and Policy Manager interface 178 ("IPM interface 178"). Configuration data 172 stores mobility information, obtained by mobility module 51 for BGW 38, regarding other breakout gateways in a service provider network. Configuration data 172 may store mobility information in one or more data structures, including tables, lists, trees, or other data structure.

In one example, an administrator using administrative interface 174 modifies configuration data 172 to specify mobility information to mobility module 51. In another example, IPM interface 178 interacts with an Identity and Policy Manager and/or a AAA device to obtain mobility information for mobility module 51. In another example, inter-BGW communication module 176 exchanges mobility information with other breakout gateways of the service provider network using, for example, Interior Border Gateway Protocol (IBGP), another form of BGP, Inter-Chassis Control Protocol (ICCP), or another communication protocol. For example, BGW 38 may receive Network Layer Reachability Information (NLRI) updates from another breakout gateway that specify, for the sending breakout gateway, PDP routes that the sending breakout gateway advertises. As another example, BGW 38 may advertise to other breakout gateways the IMSI and/or P-TMSI identifiers and/or PDP addresses for mobile devices having PDP contexts for which BGW 38 has established a breakout data path.

In a still further example, inter-BGW communication module 176 exchanges mobility information with other breakout gateways of the service provider network using a "Source RNC to Target RNC Transparent Container" information element carried in a relocation request message or an enhanced relocation request message sent by BGW 38 to other breakout gateways. Enhanced relocation denotes a method whereby the relocation of serving radio network subsystem is prepared using radio network subsystem application part (RNSAP) signaling mechanisms carried over an Iur interface. In one example, BGW 38 serves a source RNC, while another breakout gateway serves a target RNC. To exchange breakout gateway related mobility information with the other breakout gateway during an RNC-to-RNC relocation, BGW 38 receives a Source RNC to Target RNC Transparent Container information element from the source RNC. Inter-BGW communication module 176 inserts the IMSI and/or P-TMSI identifiers and/or BGW-assigned PDP addresses for mobile devices having PDP contexts for which BGW 38 has established a breakout data path, and inter-BGW communication module 176 forwards the relocation request containing the modified information element to the other breakout gateway. In some instances, inter-BGW communication module 176 also inserts a network address for BGW 38 into the information element. To insert values into the information element, inter-BGW communication module 176 may, for instance, append type-length-value (TLV) fields containing the information or overload existing fields.

The other breakout gateway receives the modified information element in the relocation request and obtains any identifiers for mobile devices for which BGW 38 has established a breakout data path. The other breakout gateway then restores the information element by removing breakout gateway related information and then forwards the relocation request to the target RNC. Relocation request messages, enhanced relocation request messages, and the "Source RNC to Target RNC Transparent Container" information element are described in 3rd Generation Partnership Project, Technical Specification Group Radio Access Network, "3GPP TS 25.413 UTRAN Iu interface, Radio Access Network Application Part (RANAP) signaling, of which Section 9 is incorporated by reference herein.

In accordance with the techniques of this disclosure, and as described in further detail below, transfer module 170 may use mobility information stored by configuration data 172 to update mobile device records 45 of breakout module 44, re-route a breakout data path to another breakout gateway of mobile service provider 2, or communicate with another breakout gateway to migrate session data. By performing these techniques, transfer module 170 may enable mobile service provider network 2 to maintain service continuity for a breakout mobile data session of mobile device 16A when mobile device 16A migrates to locations served by various ones of base stations 11.

Figure 12:
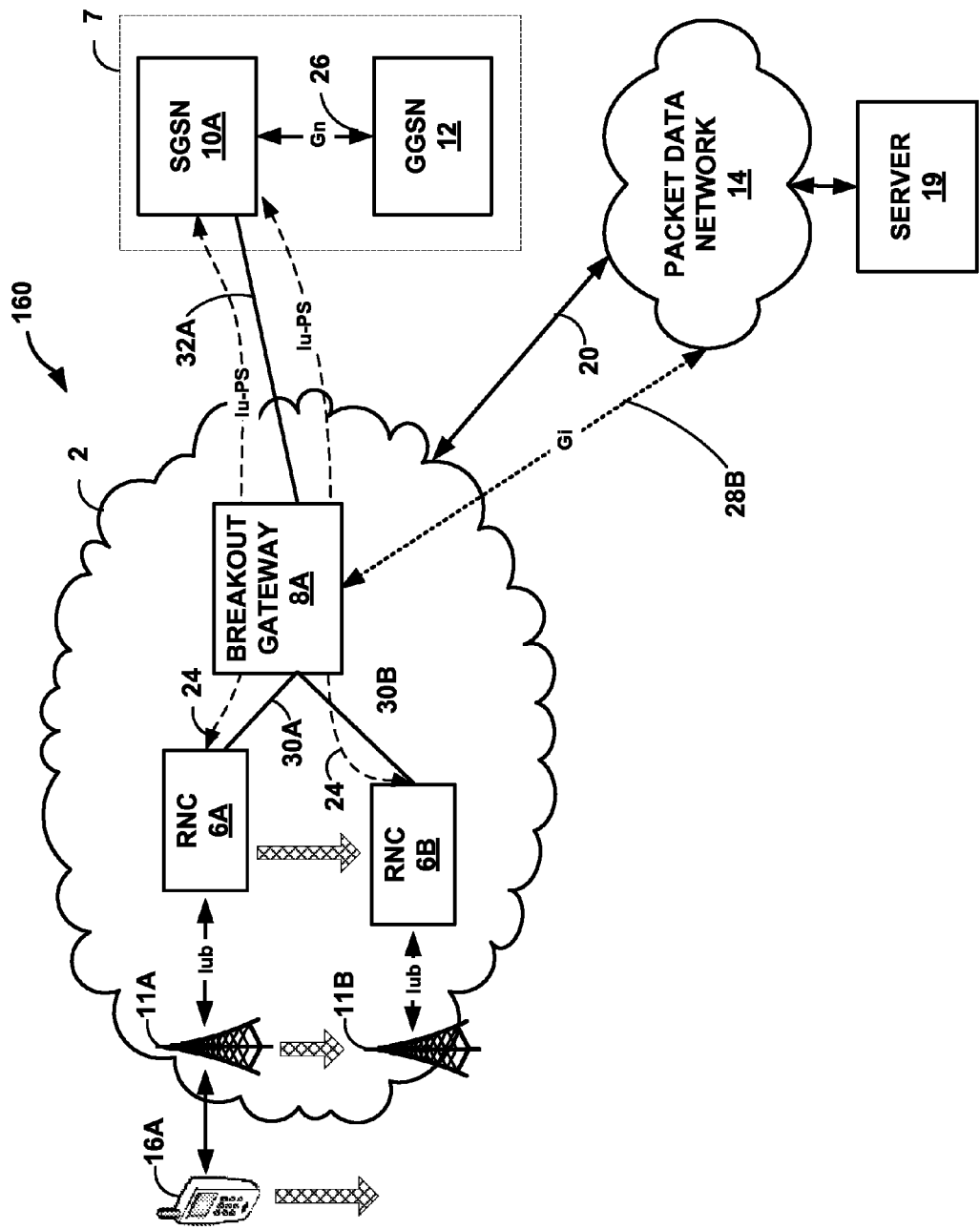
FIG. 12 is a block diagram illustrating a network system having breakout gateways that perform mobility management for a mobile device in accordance with the described techniques.

FIG. 12 is a block diagram illustrating, for purposes of clarity, a simplified representation of network system 160 of FIG. 10. In this embodiment, mobile device 16A having an active mobile data session migrates from a routing area served by base station 11A to a routing area served by base station 11B. BGWs 8 break out mobile data traffic for the active mobile data session along a breakout data path, which includes communication link 20, to PDN 14. To maintain connectivity for the active mobile data session, mobile device 16A sends SGSN 10A a Routing Area (RA) Update message via base station 11B and RNC 6B to modify the radio access bearer between mobile device 16A and SGSN 10A for the active mobile data session.

SGSN 10A initiates a RAB Assignment process with mobile device 16A by sending a RAB Assignment Request message to RNC 6B. In addition, SGSN 10A sends a RAB Assignment Request message to RNC 6A to request release of the RAB for the active mobile data session between RNC 6A and SGSN 10A.

BGW 8A serves both previous serving RNC 6A and current serving RNC 6B for mobile device 16A. In accordance with the techniques of this disclosure, BGW 8A previously established a GTP tunnel between BGW 8A and RNC 6A by replacing a source IP address of a RAB Assignment Request message with an IP address of BGW 8A. In addition, BGW 8A has a record in mobile device records 45 for the active mobile data session that, prior to the migration of mobile device 16A from service by RNC 6A to service by RNC 6B, directed BGW 8A to forward downstream mobile data traffic to RNC 6A. Because BGW 8A serves both RNC 6A and RNC 6B, BGW 8A extracts from the RAB Assignment Request message to RNC 6B the IP address of RNC 6B and the upstream TEID. BGW 8A may associate the RAB Assignment Request message with the active mobile data session using, for example, a NSAPI value. BGW 8A replaces the old values for these properties in the record in mobile device records 45 with the extracted values. That is, in the record in mobile device records 45 for the active mobile data session, BGW 8A replaces the IP address of RNC 6A with the IP address of RNC 6B and replaces the upstream TEID provided by SGSN 10A to RNC 6A with a new upstream TEID that corresponds to the upstream TEID provided by SGSN 10A to RNC 6B. BGW 8A also replaces the source IP address with an IP address of BGW 8A to ensure that RNC 6B sends upstream mobile data traffic for the active mobile data session to BGW 8A, and then BGW 8A forwards the modified RAB Assignment Request message to RNC 6B.

RNC 6B responds to the RAB Assignment Request message with a RAB Assignment Response message that includes a new downstream TEID. BGW 8A extracts the new downstream TEID and replaces the previous downstream TEID in the record in mobile device records 45 for the active mobile data session with the extracted value. BGW 8A may then identify, using the upstream TEID, upstream mobile data traffic for the active mobile data session and breaks out the mobile data traffic along a breakout data path. In addition, BGW 8A receives downstream mobile data traffic from PDN 14 address to the PDP address of mobile device 16A for the active mobile data session. BGW 8A may identify newly serving RNC 6B by keying the PDP address to the appropriate record in mobile device records 45. BGW 8A then encapsulates the received mobile data traffic in a GTP header that includes the new downstream TEID and sends the GTP packet to RNC 6B.

By performing these mobility techniques, BGW 8A may thus maintain connectivity for an active mobile data session for which BGW 8A breaks out mobile data traffic along a breakout data path to PDN 14 over communication link 20.

Figure 13:
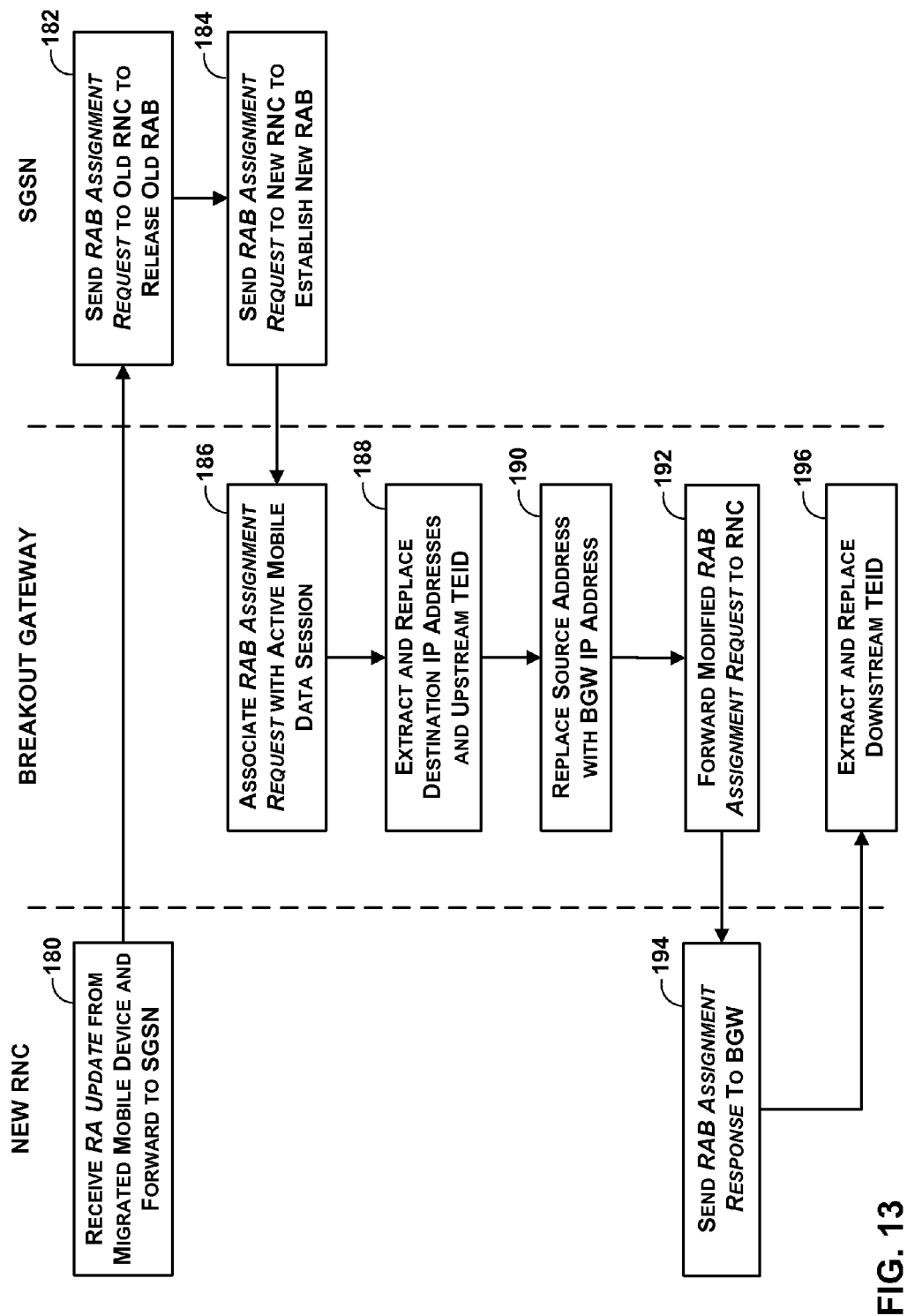
FIG. 13 is a flowchart illustrating an exemplary mode of operation of a breakout gateway to perform mobility management for a mobile device according the techniques described herein.

FIG. 13 is a flowchart illustrating an exemplary mode of operation of BGW 8A of FIG. 12 to modify a mobile device record for an active mobile data session to account for migration by the mobile device to a new location served by a different RNC. The steps illustrated in FIG. 12 are described with respect to network system 160. In this example, BGW 8A of network system 160 is embodied by BGW 38 of FIG. 4, which comprises mobility module 51 of FIG. 11.

Initially, RNC 6B receives an RA Update message from mobile device 16A that has migrated into an area served by RNC 6B and has an active mobile data session (180). RNC 6B forwards the message to SGSN 10A (180), which sends a RAB Assignment Request message to release the RAB between SGSN 10A and RNC 6A, the previous serving RNC for the active mobile data session (182). SGSN 10A additionally sends RAB Assignment Request message to RNC 6B to set up a new bearer (184). In some embodiments, the RAB Assignment Request message includes both a release request and a request to establish a new bearer. BGW 8A intercepts the RAB Assignment Request message and transfer module 170 associates the message with the active mobile data session, for which breakout module 44 maintains a record in mobile device records 45 (186).

Bearer values extractor 98 extracts the destination IP address (that is, the IP address of RNC 6B) and the upstream TEID from the RAB Assignment Request message and breakout module 44 replaces the values for these properties in the record in mobile device records 45 with the extracted values (188). In addition, RAB source modifier 82 replaces the source IP address of the RAB Assignment Request message with a source IP address of BGW 8A (190). BGW 8A then forwards the modified RAB Assignment Request message to RNC 6B via network interface 50.

RNC 6B returns a RAB Assignment Response message to BGW 8A that comprises a new downstream TEID (192). Bearer values extractor 98 extracts the new downstream TEID and replaces the value for this property in the record in mobile device records 45 with the extracted value (194). BGW 8A now terminates a GTP data tunnel with RNC 6B, which allows BGW 8A to exchange mobile data traffic with RNC 6B and therefore maintain connectivity for the active mobile data session.

Figure 14:
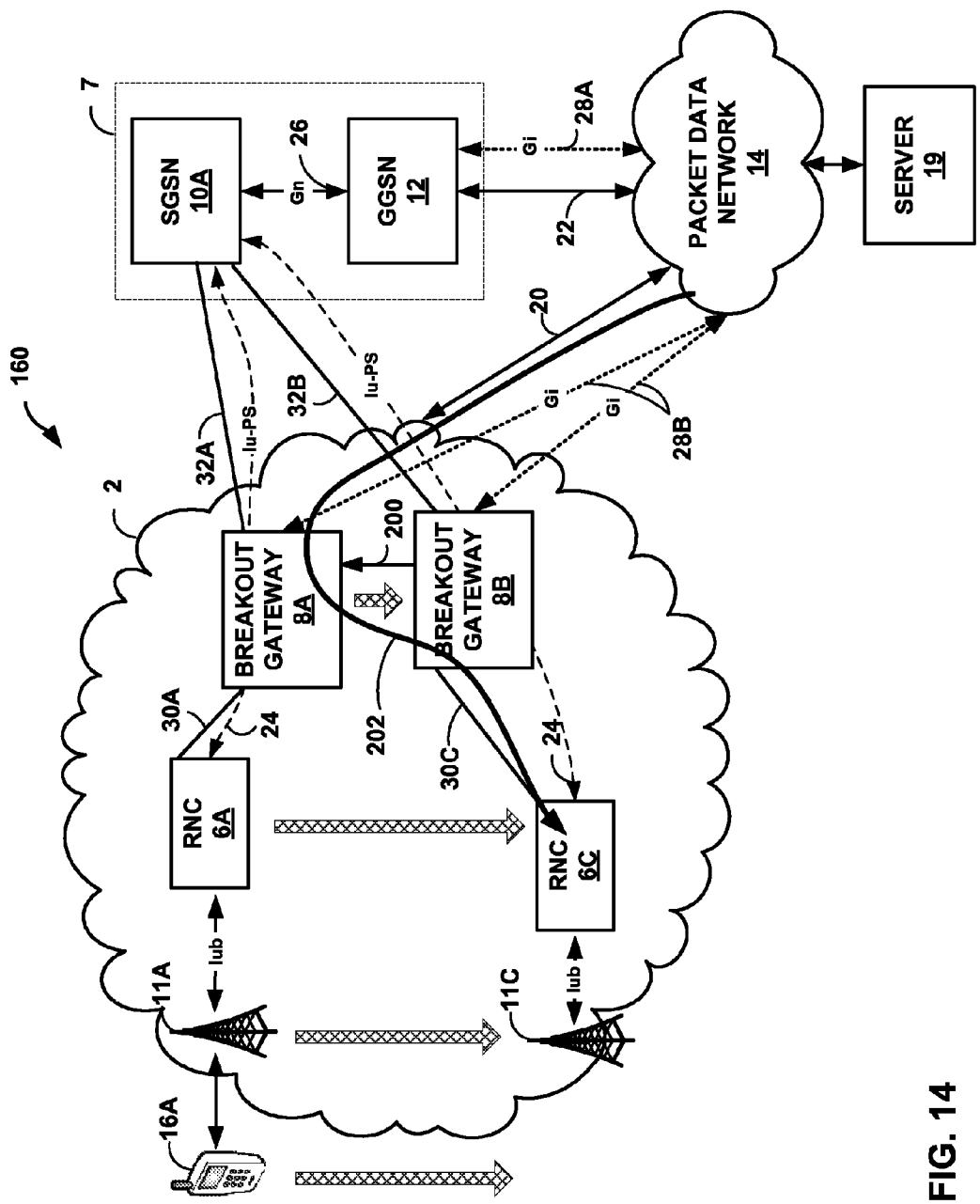
FIG. 14 is a block diagram illustrating a network system having breakout gateways that perform mobility management for a mobile device in accordance with the described techniques.

FIG. 14 is a block diagram illustrating, for purposes of clarity, a simplified representation of network system 160 of FIG. 10. In this embodiment, mobile device 16A having an active mobile data session migrates from a routing area served by base station 11A and RNC 6A to a routing area served by base station 11C and RNC 6C. BGWs 8 break out mobile data traffic for the active mobile data session along a breakout data path, which includes communication link 20, to PDN 14. To maintain connectivity for the active mobile data session, mobile device 16A sends an RA Update message via base station 11C and RNC 6C that directs SGSN 10A to modify the radio access bearer between mobile device 16A and SGSN 10A for the active mobile data session.

SGSN 10A sends a RAB Assignment Request message to RNC 6A to request release of a RAB for the active mobile data session between RNC 6A and SGSN 10A. BGW 8A may intercept the message and direct breakout module 44 to remove the record in mobile data records 45 for the active mobile data session.

To migrate the data channel for the active mobile data session, SGSN 10A sends a RAB Assignment Request message to RNC 6C to initiate a RAB assignment procedure with RNC 6C. BGW 8B, which serves RNC 6C, performs the techniques described with respect to FIGS. 4, 5, and 7 to establish a RAB between RNC 6C and BGW 8B for mobile data traffic associated with the active mobile data session.

In some instances, prior serving BGW 8A receives latent return mobile data traffic 202 from PDN 14 that is destined for a prior PDP address that had been previously assigned by BGW 8A performing the techniques of this disclosure.

In accordance with the techniques described BGW 8B advertises identifiers for mobile devices that it serves using, for example, NLRI updates to other ones of BGWs 8. The identifiers may comprise, for instance, an IMSI or a P-TMSI for a subscriber associated with the mobile device. In the illustrated example, inter-BGW communication module 176 of BGW 8A (described above with respect to FIG. 11) receives NLRI update 200 from BGW 8B that comprises mobility information, including an IMSI for mobile device 16A, to indicate that BGW 8B presently serves mobile device 16A. BGW 8A stores the mobility information in configuration data 172.

When BGW 8A receives latent return mobile data traffic 202 from PDN 14 that is destined for a prior PDP address that had been previously assigned by BGW 8A for the active mobile data session, breakout module 44 may determine from mobile device records 45 that BGW 8A no longer serves mobile device 16A. Transfer module 170 of mobility module 51 then determine from configuration data 172 that BGW 8B is presently serving mobile device 16A. For example, transfer module 170 may compare an IMSI for mobile device 16A that is stored by a record in mobile device records 45 for the active mobile data session to a record in configuration data 172 that associates BGW 8B with mobile device 16A. As a result, transfer module 170 of BGW 8A tunnels, with a generic route encapsulation (GRE) or an IP-in-IP tunnel, for instance, latent return mobile data traffic 202 to BGW 8B. BGW 8B receives latent return mobile data traffic 202 and forwards the traffic to RNC 6C for delivery to mobile device 16A. By performing the above-described techniques, BGWs 8 may enable mobile service provider network 2 to provide uninterrupted delivery of return mobile data traffic that is received, according the described techniques, from PDN 14 on a breakout data path.

In some embodiments, BGW 8B does not modify the PDP address of mobile device 16A for the active mobile data session. That is, the mobile device 16A continues to use the PDP assigned by BGW 8A. In such instances, after migrating the data channel for the active mobile data session to establish a RAB between RNC 6C and BGW 8B for mobile data traffic associated with the active mobile data session, mobile device 16A sends upstream mobile data traffic to BGW 8B. Because BGW 8B does not serve the source PDP address (i.e., the PDP address for mobile device 16A for the active mobile data session), transfer module 170 of BGW 8B determines the serving one of BGWs 8 from configuration data 172. Configuration data 172 stores mobility information that indicates the subnet, or list of PDP addresses, served by each of BGWs 8.

In such embodiments, BGW 8A sends BGW 8B an identifier for mobile device 16A that BGW 8B may use to identify mobile data traffic for which BGW 8A has established a breakout data path. For example, as described above with respect to FIG. 11, BGW 8A may send BGW 8B a relocation request message or an enhanced relocation request message that includes a "Source RNC to Target RNC Transparent Container" information element modified by BGW 8A to include, for instance, an IMSI, P-TMSI, or PDP address for mobile device 16A. BGW 8B uses the received information to identify mobile data traffic that BGW 8B is to forward to BGW 8A.

In these embodiments, transfer module 170 compares the source PDP address of the upstream mobile data traffic to the lists of PDP addresses served by each of the BGWs 8 to determine the BGW that serves the source PDP address. In the illustrated configuration, BGW 8A (the previous BGW serving mobile device 16A) serves the source PDP address. Therefore, transfer module 170 tunnels, in a GRE or IP-in-IP tunnel, for instance, the upstream mobile data traffic to BGW 8A. Downstream mobile data traffic for the active mobile data session from PDN 14 and addressed to the PDP address of mobile device 16A reaches BGW 8A.

Figure 15:
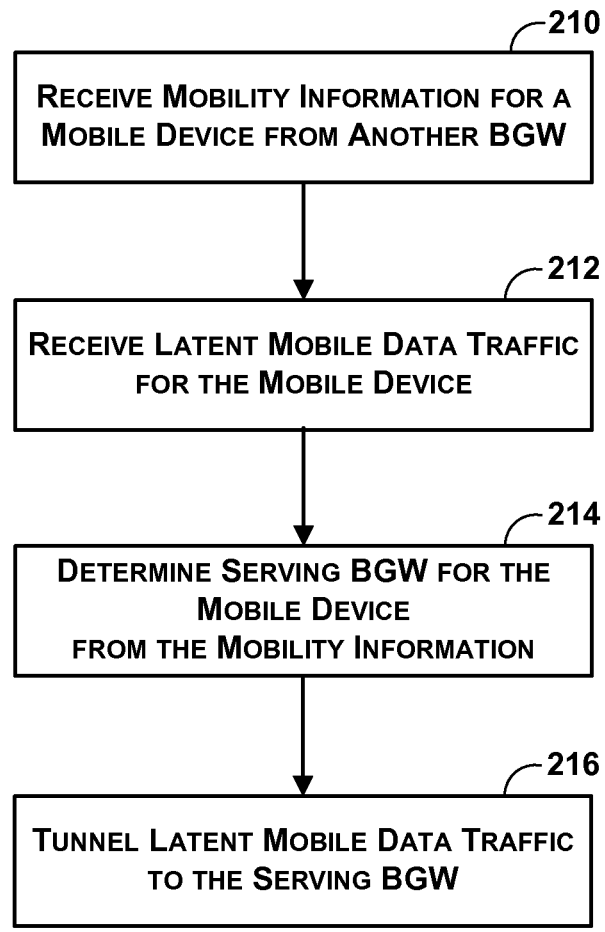
FIG. 15 is a flowchart illustrating an exemplary mode of operation of a breakout gateway to perform mobility management for a mobile device according the techniques described herein.

FIG. 15 is a flowchart illustrating an exemplary mode of operation of BGW 8A of FIG. 14 to direct latent downstream mobile data traffic to BGW 8B to account for migration by a mobile device to a new location served by a different RNC and BGW 8B. The steps illustrated in FIG. 15 are described with respect to network system 160 of FIG. 14. In this example, BGW 8A of network system 160 is embodied by BGW 38 of FIG. 4, which comprises mobility module 51 of FIG. 11.

After mobile device 16A having an active mobile data session migrates to a routing area served by BGW 8B, BGW 8A receives an advertisement from BGW 8B that comprises mobility information indicating BGW 8B is serving the mobile device (210). When BGW 8A receives mobile data traffic for the active mobile data session (212), BGW 8A determines, from the mobility information and a mobile device record for the active mobile data session, that BGW 8B is serving mobile device 16A (214). For example, transfer module 170 of BGW 8A may compare an IMSI for mobile device 16A, stored by a record in mobile device records 45 of BGW 8A for the active mobile data session, to a record in configuration data 172 that associates BGW 8B with mobile device 16A. BGW 8A then tunnels the latent mobile data traffic to BGW 8B (216) for transmission to mobile device 16A.

Figure 16:
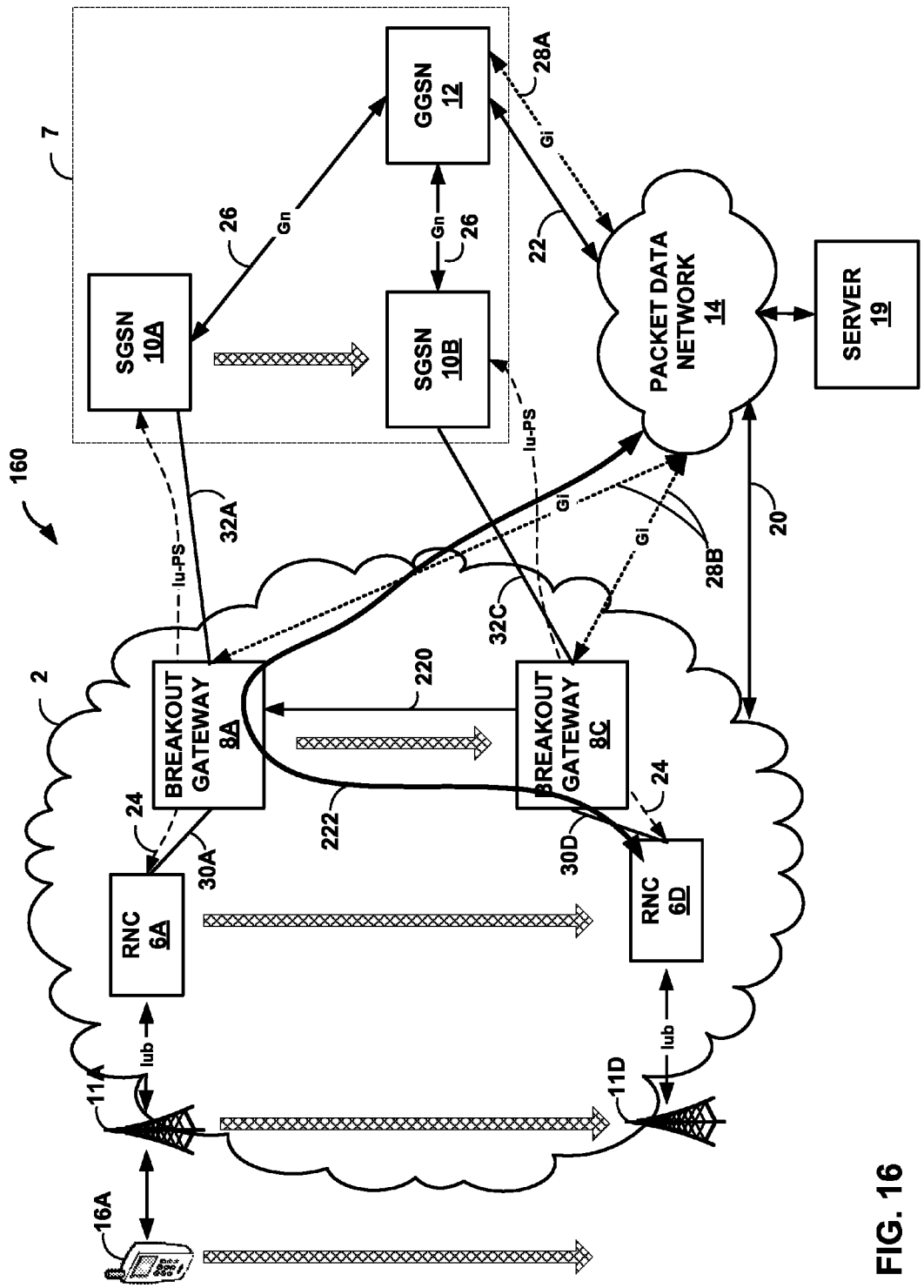
FIG. 16 is a block diagram illustrating a network system having breakout gateways that perform mobility management for a mobile device in accordance with the described techniques.

FIG. 16 is a block diagram illustrating, for purposes of clarity, a simplified representation of network system 160 of FIG. 10. In this embodiment, mobile device 16A having an active mobile data session migrates from a routing area served by base station 11A and RNC 6A to a routing area served by base station 11D and RNC 6D. BGWs 8 break out mobile data traffic for the active mobile data session along a breakout data path, which includes communication link 20, to PDN 14. To maintain connectivity for the active mobile data session, mobile device 16A sends an RA Update message via base station 11D and RNC 6D that directs mobile core network 7 to modify the radio access bearer between mobile device 16A and the mobile core network 7 for the active mobile data session.

SGSN 10B, which serves RNC 6D, receives the RA Update message and requests the session data for the active mobile data session from SGSN 10A. SGSN 10B then sends a RAB Assignment Request message to establish a new RAB with RNC 6D. SGSN 10B also creates a new GTP session with GGSN 12 by sending GGSN 12 a PDP Context Update message. During the RAB establishment process initiated by SGSN 10B to RNC 6D, BGW 8C performs the techniques of this disclosure, described in detail with respect to FIGS. 4, 5, and 7, to enable BGW 8C to terminate the RAB with RNC 6D and thereby permit BGW 8C to receive and identify mobile data traffic for the active mobile data session. That is, BGW 8C creates a record in mobile device records 45 of BGW 8C, extracts upstream and downstream TEIDs and source and destination IP addresses from the mobile control messages, and stores the extracted values in the record.

However, because mobile device 16A has already performed PDP context activation involving RNC 6A, SGSN 10A and GGSN 12, BGW 8A stores the session data for the active mobile data session in a record in mobile device records 45 of BGW 8A. The session data includes the PDP address of mobile device 16A for the active mobile data session, and may also include other values, such as an associated IMSI. BGW 8C requests this session data from BGW 8A and stores the received session in a record in mobile device records 45 of BGW 8C. In some embodiments, BGW 8C may send an identity-request message to RNC 6D to obtain an IMSI for mobile device 16A. As described above with respect to BGW 8B of FIG. 14, BGW 8C may advertise identifying information for mobile devices that it serves. In the illustrated embodiment, BGW 8C sends BGW 8A NLRI Update 220 comprising an IMSI for mobile device 16A. BGW 8A stores the identifying information in configuration data 172 of BGW 8A.

When BGW 8C receives upstream mobile data traffic 222 for the active mobile data session, transfer module 170 of BGW 8C determines from configuration data 172 that BGW 8A serves the source PDP address of upstream mobile data traffic 222. Transfer module 170 therefore tunnels the traffic to BGW 8A for transmission to PDN 14 via a breakout data path that includes communication link 20.

When BGW 8A receives downstream mobile data traffic 222 for the active mobile data session from PDN 14, transfer module 170 of BGW 8A determines from configuration data 172 that BGW 8C serves mobile device 16A. Transfer module 170 therefore tunnels downstream mobile data traffic 222 to BGW 8C for transmission to mobile device 16A via RNC 6D. By performing these techniques, BGW 8A and 8C may enable mobile service provider network 2 to provide uninterrupted connectivity for the active mobile data session.

Figure 17:
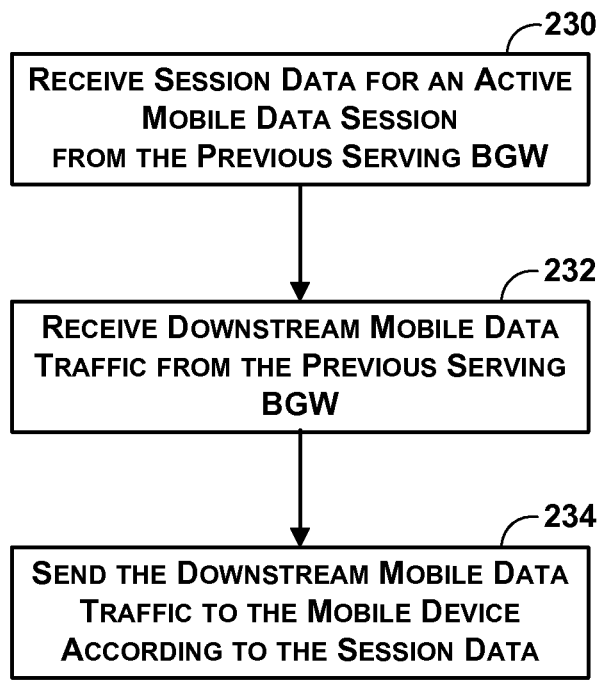
FIG. 17 is a flowchart illustrating an exemplary mode of operation of a breakout gateway to perform mobility management for a mobile device according the techniques described herein.

FIG. 17 is a flowchart illustrating an exemplary mode of operation of BGW 8C of FIG. 16 to direct downstream mobile data traffic of an active mobile data session to mobile device 16A to account for migration by the mobile device to a new location served by RNC 6D and BGW 8C. The steps illustrated in FIG. 17 are described with respect to network system 160 of FIG. 16. In this example, BGW 8C of network system 160 is embodied by BGW 38 of FIG. 4, which comprises mobility module 51 of FIG. 11.

BGW 8C acquires session data for the active mobile data session from BGW 8A, which served mobile device 16A prior to migration (230). BGW 8C then receives downstream mobile data traffic for the active mobile data session tunneled to BGW 8C by BGW 8A (232). Using the acquired session data, BGW 8C determines that mobile device 16A is to receive the traffic, and BGW 8C sends the downstream mobile data traffic to mobile device 16A via RNC 6D (234).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:

receiving, with a breakout gateway device positioned within a mobile service provider network, a service request issued by a mobile device served by a radio access network, wherein the service request specifies a requested service supported by a packet data network (PDN);

forwarding the service request from the breakout gateway device to a serving node of a mobile core network of the mobile service provider network, wherein the serving node couples the mobile core network to the radio access network to provide a first data path between the radio access network and the PDN;

receiving, with the breakout gateway device and from the radio access network, a downstream tunnel identifier that identifies a bearer between the breakout gateway device and the mobile device;

assigning, with the breakout gateway device, a network address to the mobile device for a data session associated with the service request;

receiving, with the breakout gateway device, a packet for the data session from the PDN, wherein the packet is destined for the network address; and forwarding the packet from the breakout gateway device to the bearer to bypass the serving node on a second data path between the radio access network and the PDN, wherein forwarding the packet comprises encapsulating the packet in a tunneling protocol header that specifies the downstream tunnel identifier that identifies the bearer.

2. The method of claim 1, further comprising:
advertising, with the breakout gateway device to peer routers of the breakout gateway device in the PDN, the network address as a destination for which the breakout gateway device offers connectivity.

3. The method of claim 1, further comprising:
intercepting, with the breakout gateway device, an Activate PDP Context Accept message sent by the serving node to the mobile device in response to the service request, wherein the service request is an Activate PDP Context Request;
replacing an original network address carried by the Activate PDP Context Accept message with the network address; and
sending the modified Activate PDP Context Accept message from the breakout gateway device to the mobile device.

4. The method of claim 1, further comprising:
establishing a radio access bearer (RAB) between the breakout gateway device and the mobile device for the data session, wherein the bearer comprises the RAB.

5. The method of claim 4, further comprising:
intercepting, with the breakout gateway device, a RAB Assignment Request message sent by a serving node to the mobile device;
replacing a source address for the RAB Assignment Request message with an address of the breakout gateway device;
sending the modified RAB Assignment Request message from the breakout gateway device to the mobile device; and
receiving, with the breakout gateway device, a RAB Assignment Response message from the mobile device, wherein a destination address of the RAB Assignment Response message is the address of the breakout gateway device.

6. The method of claim 5, further comprising:
extracting, with the breakout gateway device, the source address and a destination address for the RAB Assignment Request message;
extracting, with the breakout gateway device, an upstream tunnel endpoint identifier (TEID) carried by the RAB Assignment Request message;
extracting, with the breakout gateway device, a downstream TEID carried by the RAB Assignment Response message; and
storing the source address, destination address, downstream TEID, and upstream TEID to the breakout gateway device in a record as session data for the data session.

7. The method of claim 1,
wherein the network address comprises a PDP address for the data session,
wherein the bearer comprises a Radio Access Bearer (RAB) between the breakout gateway device and the mobile device.

8. The method of claim 7,
wherein encapsulating the packet in a tunneling protocol header comprises encapsulating the packet in a GTP header that specifies a downstream tunnel endpoint identifier (TEID),
wherein receiving the downstream tunnel identifier comprises receiving the downstream TEID in a RAB Assignment Response message from a radio network controller (RNC) of the radio access network.

9. The method of claim 1, further comprising:
receiving, with the breakout gateway device, data traffic for a data session associated with the requested service from a mobile device in the radio access network, wherein the data traffic is destined for the PDN;
sending the data traffic from the breakout gateway device to the PDN on the second data path only when the data traffic includes a destination address that is an address of the breakout gateway device; and
forwarding the data traffic from the breakout gateway device to the serving node when the data traffic does not include a destination address that is an address of the breakout gateway device.

10. The method of claim 1, further comprising:
receiving, with the breakout gateway device, data traffic for a data session associated with the requested service from a mobile device in the radio access network, wherein the data traffic is destined for the PDN;
receiving, with the breakout gateway device, control traffic from a radio network controller of the radio access network; and
establishing, with the breakout gateway device, the data session according to the control traffic to cause the breakout gateway device, when the control traffic exhibits a breakout indicator, to bypass the serving node by sending the data traffic from the breakout gateway device to the PDN on the second data path between the radio access network and the PDN.

11. The method of claim 10, wherein the breakout indicator is selected from the group consisting of an access point name, an International Mobile Subscriber Identity (IMSI) value, or an International Mobile Equipment Identity (IMEI) value.

12. The method of claim 10,
wherein the breakout gateway device is a first proxy device for the serving node to the radio access network, and
wherein the breakout gateway device is a second proxy device for the radio network controller to the serving node.

13. The method of claim 10, wherein the control traffic is first control traffic and the radio network controller is a first radio network controller, and further comprising:
receiving, with the breakout gateway device, second control traffic associated with the data session from a second radio network controller of the radio access network; and
modifying one or more session data values for the data session with session data values carried by the second control traffic.

14. The method of claim 1, wherein the breakout gateway device is a first breakout gateway device, and further comprising:
receiving, with the first breakout gateway device, mobility information from a second breakout gateway device indicating that the second breakout gateway device serves a radio network controller (RNC) of the radio access network that serves the mobile device;
receiving, with the first breakout gateway device, downstream data traffic for the data session from the PDN;
determining, from the mobility information and session data for the data session, that the second breakout gateway device serves the RNC of the radio access network that serves the mobile device; and
tunneling the downstream data traffic from the first breakout gateway device to the second breakout gateway device.

15. The method of claim 1, wherein the breakout gateway device is a first breakout gateway device, and further comprising:

storing, with the first breakout gateway device, mobility information indicating that a second breakout gateway device serves a first network address;

determining, with the first breakout gateway device, that the data traffic is sourced by the first PDP address; and tunneling the data traffic from the first breakout gateway device to the second breakout gateway device based at least on the determination.

16. The method of claim 1, wherein the breakout gateway device is a first breakout gateway device, and further comprising:

receiving, with the first breakout gateway device, session data for the data session from a second breakout gateway device, wherein the second breakout gateway device serves a second radio network controller (RNC) of the radio access network that previously served the mobile device, and wherein the first breakout gateway device serves a first radio network controller (RNC) of the radio access network that currently serves the mobile device;

receiving, with the first breakout gateway device, downstream data traffic for the data session from the second breakout gateway device, wherein the downstream data traffic comprises a network packet having destination network address;

determining, with the first breakout gateway device, from the session data that the destination network address of the network packet is a network address for the mobile device; and sending the downstream data traffic from the first breakout gateway device to the mobile device based at least on the determination.

17. A breakout gateway device positioned within a mobile service provider network, comprising:

a network interface to receive a service request issued by a mobile device from a radio access network, wherein the service request is addressed to a serving node of a mobile core network of the mobile service provider network and specifies a requested service supported by a packet data network (PDN);

a control packet analysis module to forward the service request from the breakout gateway device to the serving node, wherein the serving node couples the mobile core network to the radio access network to provide a first data path between the radio access network and the PDN;

an address pool comprising one or more network addresses;

an address allocator to assign a network address from the address pool to the mobile device for a data session associated with the service request; and a breakout module to, upon receiving a packet for the data session from the PDN and destined for the network address, forward the packet from the breakout gateway device to the bearer to bypass the serving node on a second data path between the radio access network and the PDN, wherein the network interface receives, from the radio access network, a downstream tunnel identifier that identifies a bearer between the breakout gateway device and the mobile device, and wherein the breakout module forwards the packet by encapsulating the packet in a tunneling protocol header that specifies the downstream tunnel identifier that identifies the bearer.

18. The breakout gateway device of claim 17, further comprising:

a routing engine to advertise, to peer routers of the breakout gateway device in the PDN, the network address as a destination for which the breakout gateway device offers connectivity.

19. The breakout gateway device of claim 17, wherein the network interface intercepts an Activate PDP Context Accept message sent by the serving node to the mobile device in response to the service request, wherein the service request is an Activate PDP Context Request, and further comprising:

a packet data protocol (PDP) address modifier to replace an original network PDP address carried by the Activate PDP Context Accept message with the network address, wherein the network interface sends the modified Activate PDP Context Accept message to the mobile device.

20. The breakout gateway device of claim 17, further comprising a radio access bearer (RAB) source modifier to establish a radio access bearer between the breakout gateway device and the mobile device for the data session, wherein the bearer comprises the RAB.

21. The breakout gateway device of claim 20, wherein the network interface intercepts a RAB Assignment Request message sent by a serving node to the mobile device, wherein the RAB source modifier replaces a source address for the RAB Assignment Request message with a source address of the breakout gateway device, wherein the network interface sends the modified RAB Assignment Request message from the breakout gateway device to the mobile device, wherein the network interface receives a RAB Assignment Response message from the mobile device, wherein a destination address of the RAB Assignment Response message is the address of the breakout gateway device.

22. The breakout gateway device of claim 21, further comprising:

a bearer values extractor to extract the source address and a destination address for the RAB Assignment Request message, extract an upstream tunnel endpoint identifier (TEID) carried by the RAB Assignment Request message, and extract a downstream TEID carried by the RAB Assignment Response message; and a mobile device records module to store one or more records, wherein the breakout module stores the source address, destination address, downstream TEID, and upstream TEID to the breakout gateway device in one of the records as session data for the data session.

23. The breakout gateway device of claim 17, wherein the network address comprises a PDP address for the data session, wherein the bearer comprises a Radio Access Bearer (RAB) between the breakout gateway device and the mobile device.

24. The breakout gateway device of claim 17, wherein the breakout module encapsulates the packet in a GTP header that specifies a downstream tunnel endpoint identifier (TEID), wherein the network devices receives the downstream TEID in a RAB Assignment Response message from a radio network controller (RNC) of the radio access network, wherein the downstream tunnel identifier comprises the downstream TEID.

25. The breakout gateway device of claim 17, wherein the network interface receives data traffic for a data session associated with the requested service from a mobile device in the radio access network, wherein the data traffic is destined for the PDN, wherein the breakout module sends the data traffic to the PDN on the second data path only when the data traffic includes a destination address that is an address of the breakout gateway device, wherein the breakout module forwards the data traffic to the serving node when the data traffic does not include a destination address that is an address of the breakout gateway device.

26. The breakout gateway device of claim 17, wherein the network interface receives control traffic from a radio network controller of the radio access network, and further comprising:
   one or more breakout indicators;
   a lookup module to match a property of the control traffic to one of the breakout indicators;
   a breakout session setup module to establish the data session according to the control traffic to cause the breakout gateway device, when the lookup module matches a property of the control traffic to one of the breakout indicators, to bypass the serving node by sending the data traffic from the breakout gateway device to the PDN on the second data path between the radio access network and the PDN.

27. The breakout gateway device of claim 26, wherein the property of the control traffic is selected from the group consisting of an access point name, an International Mobile Subscriber Identity (IMSI) value, or an International Mobile Equipment Identity (IMEI) value.

28. The breakout gateway device of claim 26, further comprising:
   a radio network controller proxy to receive, from the serving node, traffic destined for a radio network controller in the radio access network; and
   a serving node proxy to receive, from a radio network controller in the radio access network, traffic destined for the serving node.

29. The breakout gateway device of claim 26, further comprising:
   a mobile device records module to store one or more records,
   wherein the control traffic is first control traffic and the radio network controller is a first radio network controller,
   wherein the network interface receives second control traffic associated with the data session from a second radio network controller of the radio access network, and
   wherein the breakout module modifies one or more session data values in a record for the data session with session data values carried by the second control traffic.

30. The breakout gateway device of claim 26, wherein the network interface receives control traffic from a radio network controller of the radio access network via a policy router of the service provider network.

31. The breakout gateway device of claim 17, further comprising:
   a configuration data module to store mobility information indicating that a second breakout gateway device serves a radio network controller (RNC) of the radio access network that serves the mobile device, wherein the network interface receives downstream data traffic for the data session from the PDN; and
   a transfer module to determine, from the mobility information and session data for the data session, that the second breakout gateway device serves the RNC of the radio access network that serves the mobile device, wherein the transfer module tunnels the downstream data traffic to the second breakout gateway device based at least on the determination.

32. The breakout gateway device of claim 17, further comprising:
   a configuration data module to store mobility information indicating that a second breakout gateway device serves a first PDP address; and
   a transfer module to determine that the data traffic is sourced by the first PDP address, wherein the transfer module tunnels the data traffic to the second breakout gateway device based at least on the determination.

33. The breakout gateway device of claim 17,
   wherein the breakout gateway device is a first breakout gateway device,
   wherein the network interface receives session data for the data session from a second breakout gateway device, wherein the second breakout gateway device serves a second radio network controller (RNC) of the radio access network that previously served the mobile device, and wherein the first breakout gateway device serves a first radio network controller (RNC) of the radio access network that currently serves the mobile device,
   wherein the network interface receives downstream data traffic for the data session from the second breakout gateway device, wherein the data traffic comprises a network address having a destination network address, and
   wherein the breakout module determines, from the session data, that the destination network address is the network address for the mobile device and sends the downstream data traffic via the network interface to the mobile device based at least on the determination.

34. A computer-readable storage medium comprising instructions for causing a programmable processor to:
   receive, with a breakout gateway device positioned within a mobile service provider network, a service request issued by a mobile device served by a radio access network, wherein the service request specifies a requested service supported by a packet data network (PDN);
   forward the service request from the breakout gateway device to a serving node of a mobile core network of the mobile service provider network, wherein the serving node couples the mobile core network to the radio access network to provide a first data path between the radio access network and the PDN;
   receive, with the breakout gateway device and from the radio access network, a downstream tunnel identifier that identifies a bearer between the breakout gateway device and the mobile device;
   assign, with the breakout gateway device, a network address to the mobile device for a data session associated with the service request;
   receive, with the breakout gateway device, a packet for the data session from the PDN, wherein the packet is destined for the network address; and
   forward the packet from the breakout gateway device to the bearer to bypass the serving node on a second data path between the radio access network and the PDN, wherein forwarding the packet comprises encapsulating the packet in a tunneling protocol header that specifies the downstream tunnel identifier that identifies the bearer.

* * * * *